(12) United States Patent
Lee et al.

(10) Patent No.: US 11,799,692 B2
(45) Date of Patent: Oct. 24, 2023

(54) METHOD FOR PERFORMING CHANNEL ESTIMATION IN WIRELESS COMMUNICATION SYSTEM AND APPARATUS THEREFOR

(71) Applicant: LG ELECTRONICS INC., Seoul (KR)

(72) Inventors: Hyunho Lee, Seoul (KR); Duckhyun Bae, Seoul (KR); Yunjung Yi, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 431 days.

(21) Appl. No.: 17/264,422

(22) PCT Filed: Aug. 12, 2019

(86) PCT No.: PCT/KR2019/010225
§ 371 (c)(1),
(2) Date: Jan. 29, 2021

(87) PCT Pub. No.: WO2020/032773
PCT Pub. Date: Feb. 13, 2020

(65) Prior Publication Data
US 2021/0320821 A1   Oct. 14, 2021

Related U.S. Application Data

(60) Provisional application No. 62/830,529, filed on Apr. 7, 2019, provisional application No. 62/827,236, filed (Continued)

(51) Int. Cl.
*H04L 25/02* (2006.01)
*H04W 56/00* (2009.01)
(Continued)

(52) U.S. Cl.
CPC ....... *H04L 25/0204* (2013.01); *H04W 56/001* (2013.01); *H04W 72/23* (2023.01); *H04W 74/0833* (2013.01)

(58) Field of Classification Search
CPC ... H04L 25/0204; H04L 5/005; H04L 5/0053; H04W 56/001; H04W 72/23; H04W 74/0833; H04W 56/00
See application file for complete search history.

(56) References Cited

U.S. PATENT DOCUMENTS

2020/0305168 A1*   9/2020   Liou ............... H04W 76/11

FOREIGN PATENT DOCUMENTS

WO   WO2017010798   1/2017
WO   WO2018128218   7/2018

OTHER PUBLICATIONS

Catt, "Search space design for NR-PDCCH," R1-1712393, 3GPP TSG RAN WG1 Meeting #90, Prague, Czechia, dated Aug. 21-25, 2017, 5 pages.

(Continued)

*Primary Examiner* — Kyaw Z Soe
(74) *Attorney, Agent, or Firm* — Fish & Richardson P.C.

(57) ABSTRACT

A method of performing channel estimation of a physical downlink control channel (PDCCH) in a wireless communication system is disclosed. Specifically, the method performed by a user equipment (UE) includes receiving a synchronization signal block (SSB) from a base station, receiving system information (SI) from the base station based on the SSB, transmitting a physical random access channel (PRACH) preamble to the base station, receiving a response to the PRACH preamble from the base station, transmitting UE capability information related to the channel estimation to the base station, receiving information for a PDCCH monitoring duration from the base station, and
(Continued)

performing the channel estimation based on the information for the PDCCH monitoring duration. The UE capability information includes information for a maximum number of control channel elements (CCEs) that are capable of the channel estimation per PDCCH monitoring duration.

10 Claims, 18 Drawing Sheets

Related U.S. Application Data on Apr. 1, 2019, provisional application No. 62/716,992, filed on Aug. 10, 2018.

(51) Int. Cl.
*H04W 74/08* (2009.01)
*H04W 72/23* (2023.01)

(56) References Cited

OTHER PUBLICATIONS

Huawei, HiSilicon, "Remaining issues on search space," R1-1805881, 3GPP TSG RAN WG1 Meeting #93, Busan, Korea, dated May 21-25, 2018, 7 pages.

NTT Docomo, Inc., "Search space," R1-1805048 3GPP TSG RAN WG1 Meeting #92bis, Sanya, China, dated Apr. 16-20, 2018, 12 pages.

PCT International Search Report in International Appln. No. PCT/KR2019/010225, dated Dec. 12, 2019, 7 pages (with English translation).

* cited by examiner

METHOD FOR PERFORMING CHANNEL ESTIMATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/010225, filed on Aug. 12, 2019, which claims the benefit of U.S. Provisional Application No. 62/716,992, filed on Aug. 10, 2018, No. 62/827,236, filed on Apr. 1, 2019, and No. 62/830,529, filed on Apr. 7, 2019, the contents of which are all hereby incorporated by reference herein in their entirety.

TECHNICAL FIELD

The present disclosure relates to a wireless communication system, and more particularly, to a method of reporting a maximum number of control channel elements (CCEs) capable of channel estimation and a device supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure provides a method of reporting a maximum number of CCEs capable of channel estimation in one PDCCH monitoring duration.

The technical objects to be achieved by the present disclosure are not limited to those that have been described hereinabove merely by way of example, and other technical objects that are not mentioned can be clearly understood from the following descriptions by those skilled in the art, to which the present disclosure pertains.

Technical Solution

In one aspect, there is provided a method of performing, by a user equipment (UE), a channel estimation of a physical downlink control channel (PDCCH) in a wireless communication system, the method comprising receiving a synchronization signal block (SSB) from a base station, receiving system information (SI) from the base station based on the SSB, transmitting a physical random access channel (PRACH) preamble to the base station, receiving a response to the PRACH preamble from the base station, transmitting, to the base station, UE capability information related to the channel estimation, receiving information for a PDCCH monitoring duration from the base station, and performing the channel estimation based on the information for the PDCCH monitoring duration, wherein the UE capability information includes information for a maximum number of control channel elements (CCEs) that are capable of the channel estimation per PDCCH monitoring duration.

The information for the maximum number of CCEs may be determined based on at least one of a length of the PDCCH monitoring duration, an interval between the PDCCH monitoring durations, and/or a numerology.

The maximum number of CCEs may be a number of non-overlapped CCEs.

The information for the maximum number of CCEs may be determined based on at least one of a service type, quality of service (QoS), a service requirement, and/or a processing time.

The information for the maximum number of CCEs may be determined based on at least one of a physical downlink shared channel (PDSCH) processing time and/or a physical uplink shared channel (PUSCH) preparation time of the UE.

The information for the maximum number of CCEs may be determined based on at least one of a transport block size, a number of layers, and/or a number of resource blocks of a physical downlink shared channel (PDSCH) or a physical uplink shared channel (PUSCH).

A timing interval between the PDCCH and a physical downlink shared channel (PDSCH) may be configured based on the information for the maximum number of CCEs.

In another aspect, there is provided a user equipment (UE) performing a channel estimation of a physical downlink control channel (PDCCH) candidate in a wireless communication system, the UE comprising a radio frequency (RF) unit configured to transmit and receive a radio signal, and a processor functionally connected to the RF unit, wherein the processor is configured to receive a synchronization signal block (SSB) from a base station, receive system information (SI) from the base station based on the SSB, transmit a physical random access channel (PRACH) preamble to the base station, receive a response to the PRACH preamble from the base station, transmit, to the base station, UE capability information related to the channel estimation, receive information for a PDCCH monitoring duration from the base station, and perform the channel estimation based on the information for the PDCCH monitoring duration, wherein the UE capability information includes information for a maximum number of control channel elements (CCEs) that are capable of the channel estimation per PDCCH monitoring duration.

The information for the maximum number of CCEs may be determined based on at least one of a length of the PDCCH monitoring duration, an interval between the PDCCH monitoring durations, and/or a numerology.

The maximum number of CCEs may be a number of non-overlapped CCEs.

The information for the maximum number of CCEs may be determined based on at least one of a service type, quality of service (QoS), a service requirement, and/or a processing time.

The information for the maximum number of CCEs may be determined based on at least one of a physical downlink shared channel (PDSCH) processing time and/or a physical uplink shared channel (PUSCH) preparation time of the UE.

The information for the maximum number of CCEs may be determined based on at least one of a transport block size, a number of layers, and/or a number of resource blocks of a physical downlink shared channel (PDSCH) or a physical uplink shared channel (PUSCH).

A timing interval between the PDCCH and a physical downlink shared channel (PDSCH) may be configured based on the information for the maximum number of CCEs.

Advantageous Effects

The present disclosure can allow flexible and efficient resource utilization in various service types by reporting a maximum number of CCEs capable of channel estimation in one PDCCH monitoring duration.

The present disclosure can implement a communication system of low latency and high reliability by performing more accurate channel estimation.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

MODE FOR INVENTION

Figure 1:
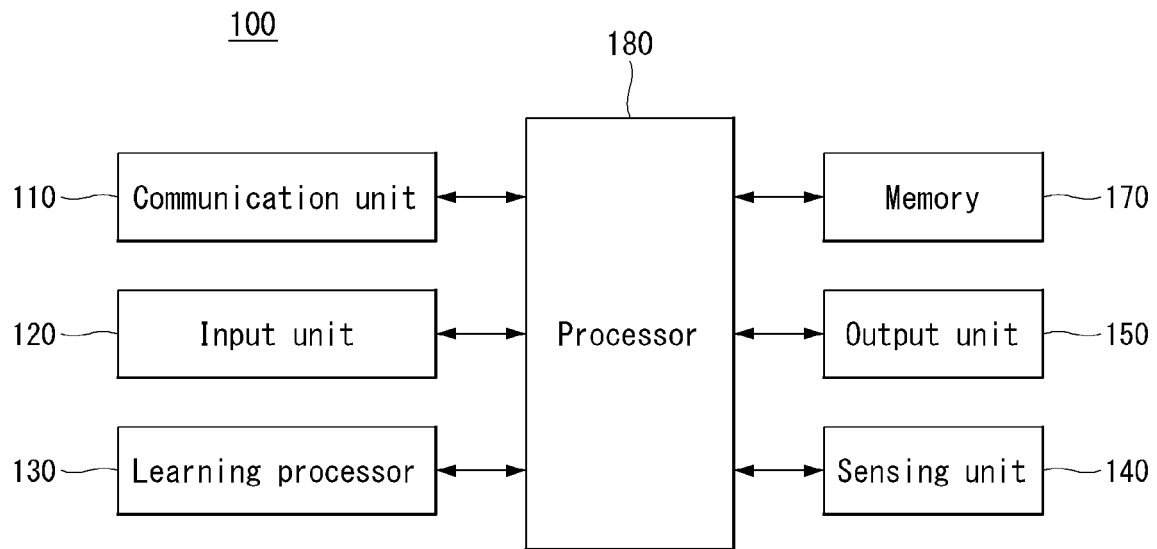
FIG. 1 is a diagram showing an AI device to which a method proposed in the disclosure may be applied.

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the following, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure may be supported by standard documents disclosed in at least one of IEEE 802, 3GPP, and 3GPP2 which are the wireless access systems. That is, steps or parts in the embodiments of the present disclosure which are not described to clearly show the technical spirit of the present disclosure may be supported by the standard documents. Further, all terms described in this document may be described by the standard document.

3GPP LTE/LTE-A/New RAT (NR) is primarily described for clear description, but technical features of the present disclosure are not limited thereto.

Hereinafter, examples of 5G use scenarios to which a method proposed in the disclosure may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method proposed in the disclosure may be applied.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

Figure 2:
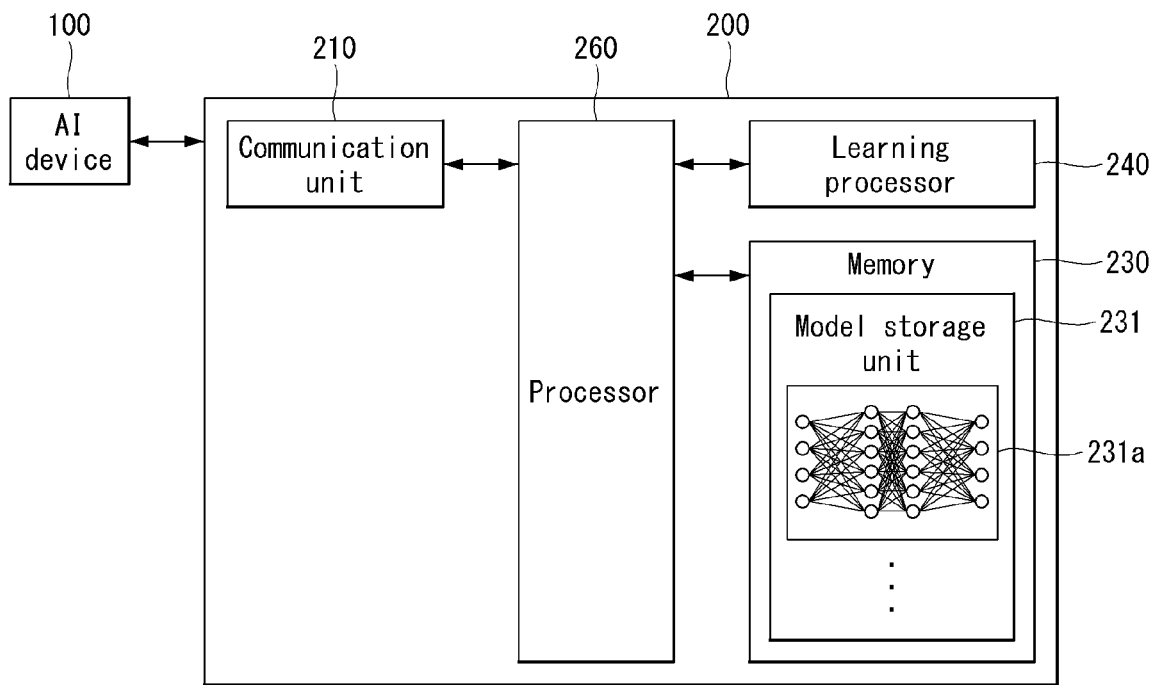
FIG. 2 is a diagram showing an AI server to which a method proposed in the disclosure may be applied.

FIG. 2 is a diagram showing the AI server 200 to which a method proposed in the disclosure may be applied.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 3:
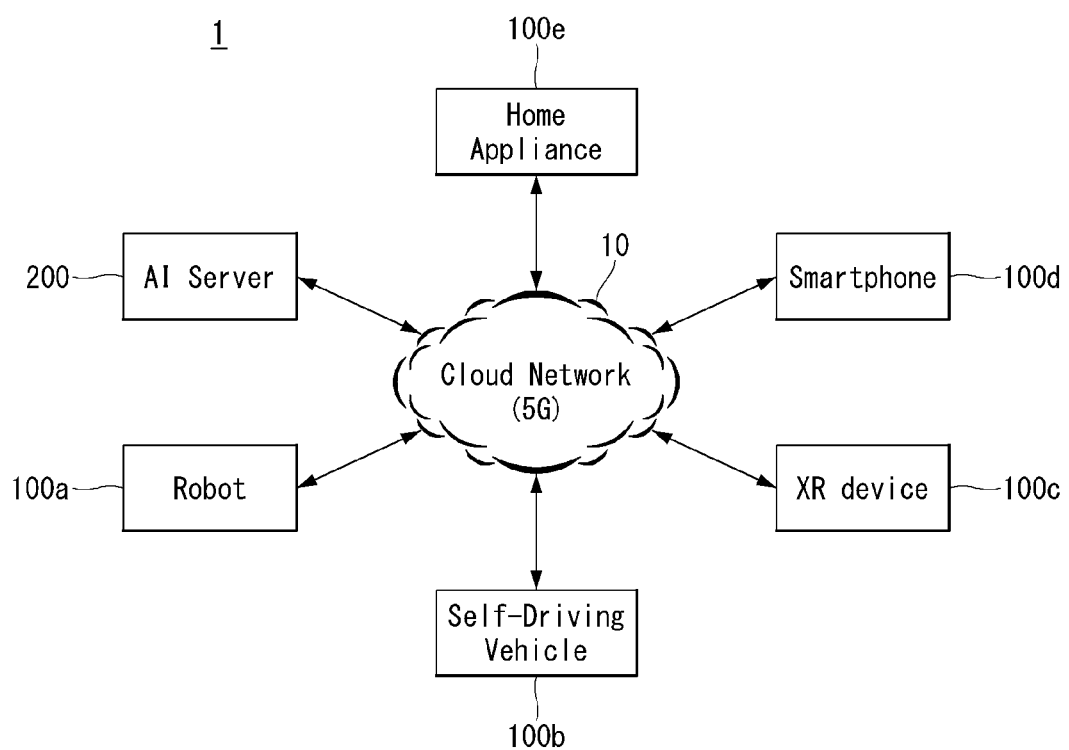
FIG. 3 is a diagram showing an AI system to which a method proposed in the disclosure may be applied.

FIG. 3 is a diagram showing an AI system 1 to which a method proposed in the disclosure may be applied.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

AI+Self-Driving

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

AI+XR

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information for a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100*a* interacting with the self-driving vehicle 100*b*.

The robot 100*a* having the self-driving function may collectively refer to devices that autonomously run along a given flow without control of a user or that autonomously determine a flow and move.

The robot 100*a* and the self-driving vehicle 100*b* having the self-driving function may use a common sensing method in order to determine one or more of a moving path or a running plan. For example, the robot 100*a* and the self-driving vehicle 100*b* having the self-driving function may determine one or more of a moving path or a running plan using information sensed through a LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

As the spread of smartphones and IoT (Internet of Things) terminals is rapidly spreading, the amount of information exchanged through a communication network is increasing. As a result, next-generation wireless access technologies can provide faster service to more users than traditional communication systems (or traditional radio access technologies) (e.g., enhanced mobile broadband communication) Needs to be considered.

To this end, the design of a communication system that considers Machine Type Communication (MTC), which provides services by connecting a number of devices and objects, is being discussed. It is also being discussed as a multiuser of communication systems (e.g., Ultra-Reliable and Low Latency Communication, URLLC) that take into account the reliability and/or latency-sensitive services (service) and/or a user equipment.

Hereinafter, in the present disclosure, for convenience of description, the next generation radio access technology is referred to as NR (New RAT), and the radio communication system to which the NR is applied is referred to as an NR system.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

Figure 4:
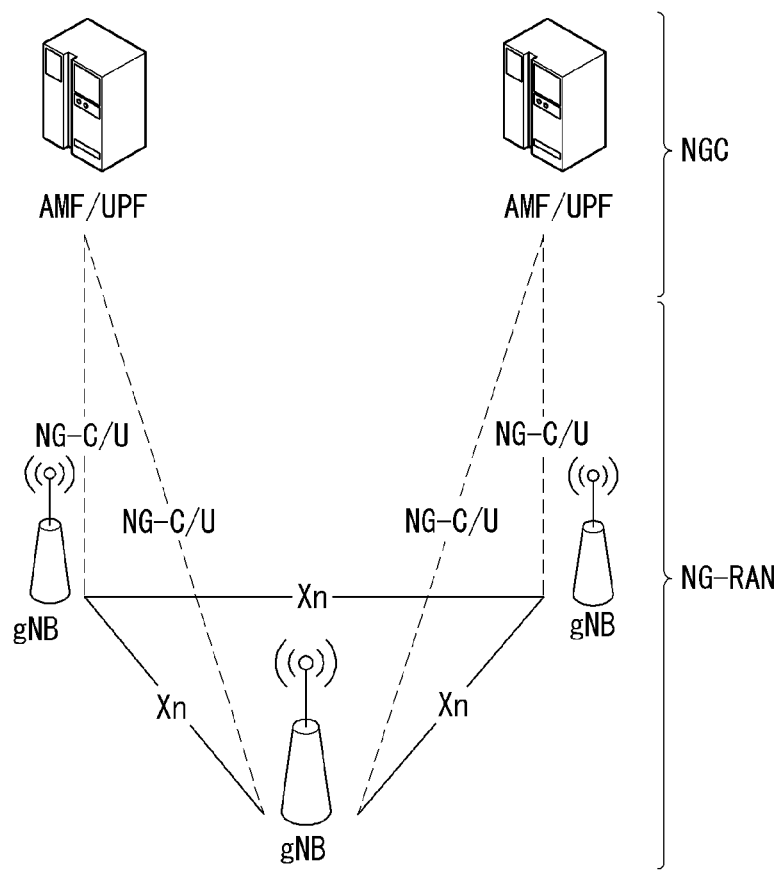
FIG. 4 illustrates an example of an overall structure of an NR system to which a method proposed in the disclosure may be applied.

FIG. 4 illustrates an example of an overall structure of an NR system to which a method proposed in the disclosure may be applied.

Referring to FIG. 4, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |

TABLE 1-continued

| μ | $\Delta f = 2^\mu \cdot 15$ [kHz] | Cyclic prefix |
|---|---|---|
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 5:
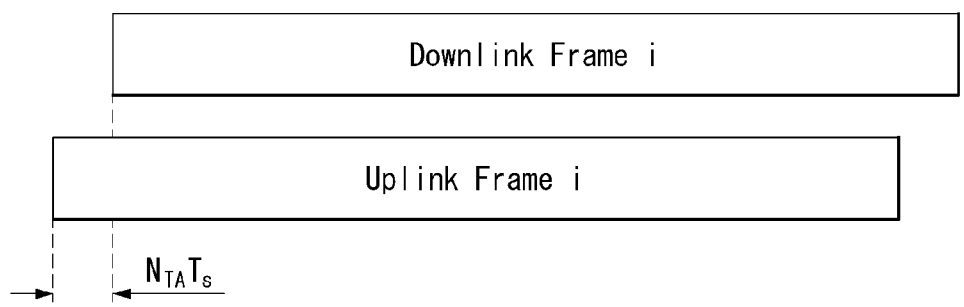
FIG. 5 illustrates the relation between an uplink frame and a downlink frame in a wireless communication system to which a method proposed in the disclosure may be applied.

FIG. 5 illustrates the relation between an uplink frame and a downlink frame in a wireless communication system to which a method proposed in the disclosure may be applied.

As illustrated in FIG. 5, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

Figure 6:
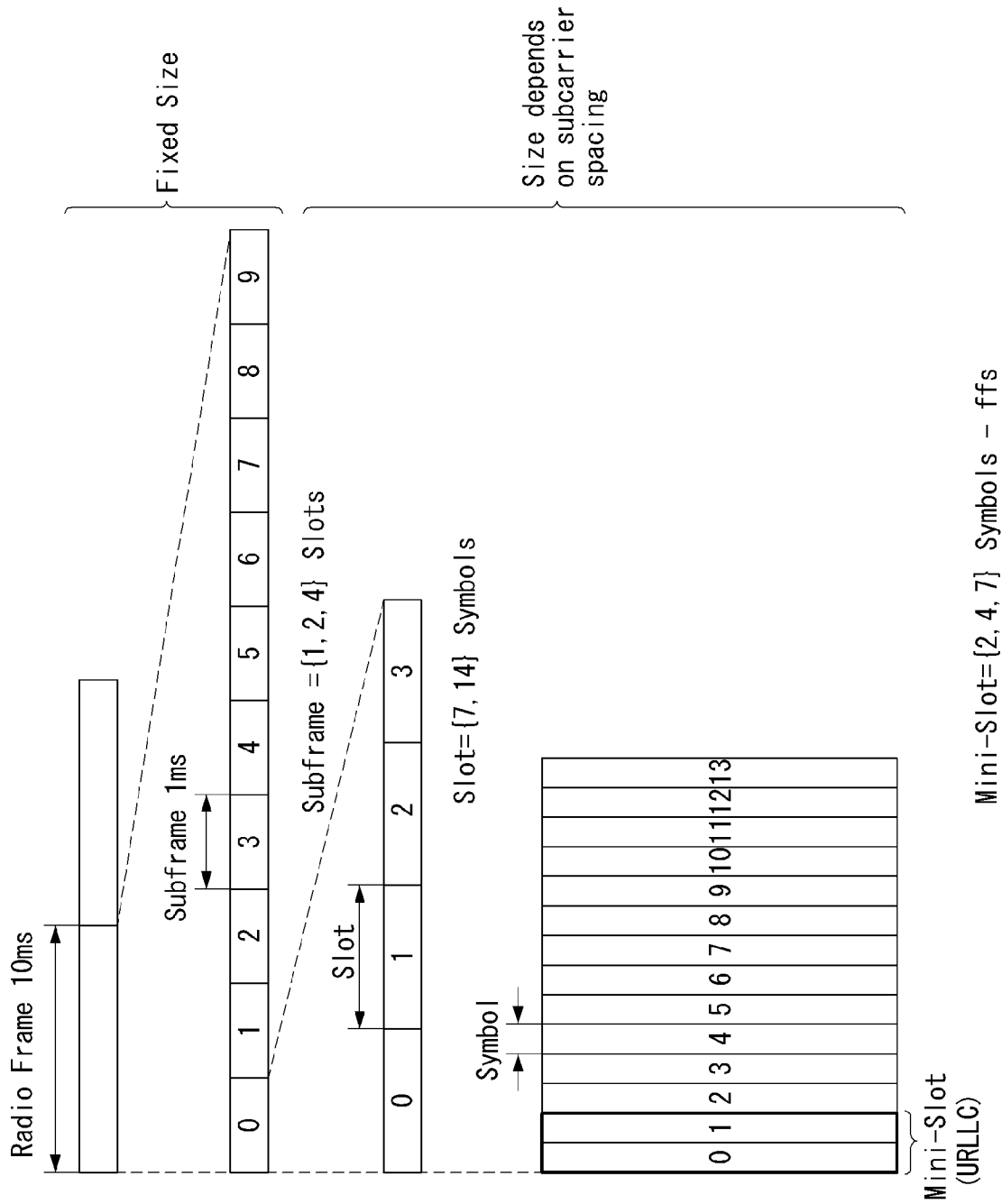
FIG. 6 illustrates an example of a frame structure in an NR system.

FIG. 6 illustrates an example of a frame structure in an NR system. FIG. 6 is merely for convenience of explanation and does not limit the scope of the disclosure.

In Table 3, in case of μ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc. may be considered.

Hereinafter, the above physical resources that can be considered in the NR system are described in more detail.

First, in relation to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

Figure 7:
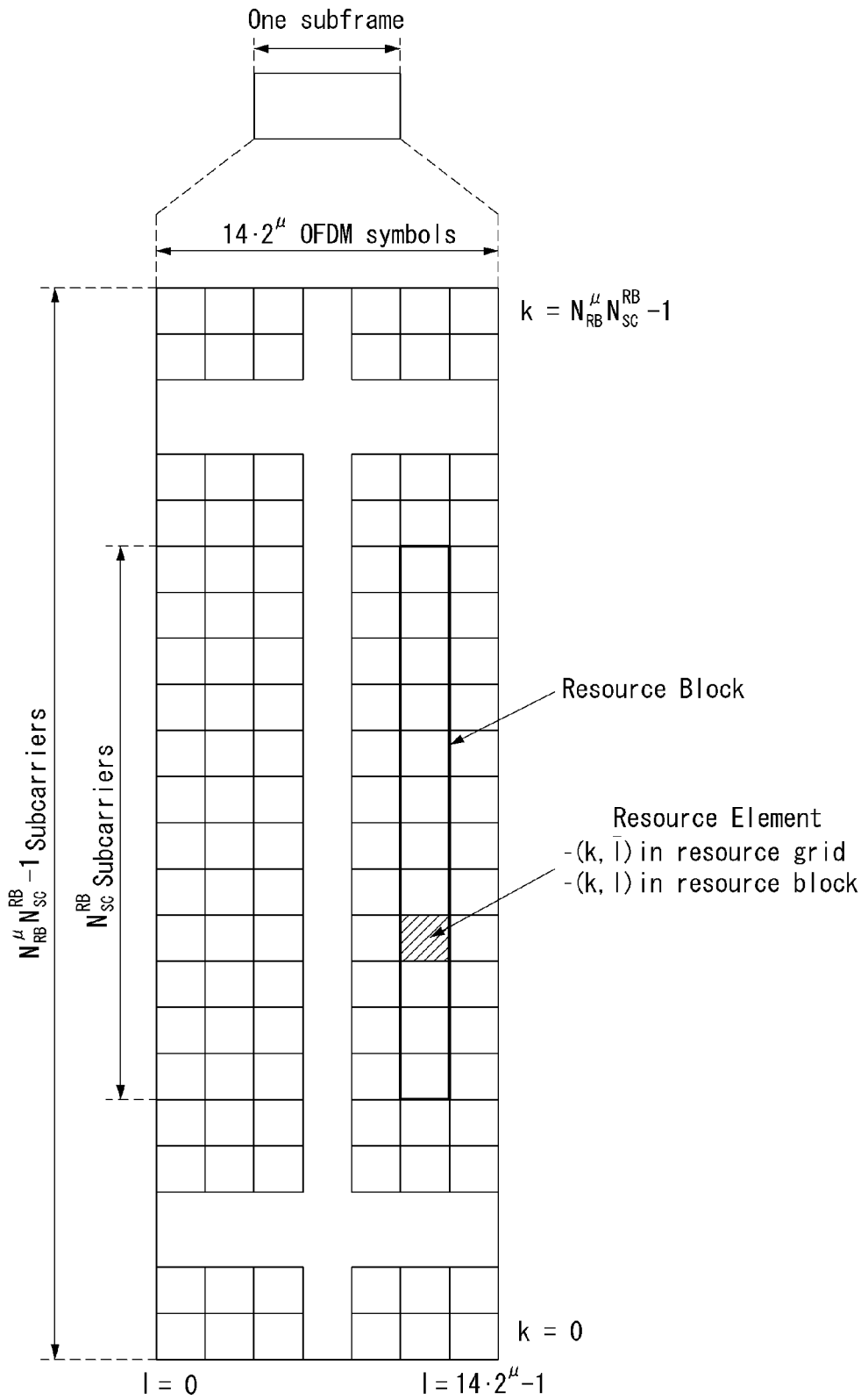
FIG. 7 illustrates an example of a resource grid supported in a wireless communication system to which a method proposed in the disclosure may be applied.

FIG. 7 illustrates an example of a resource grid supported in a wireless communication system to which a method proposed in the disclosure may be applied.

Referring to FIG. 7, a resource grid consists of $N_{RB}^{\mu} N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

Figure 8:
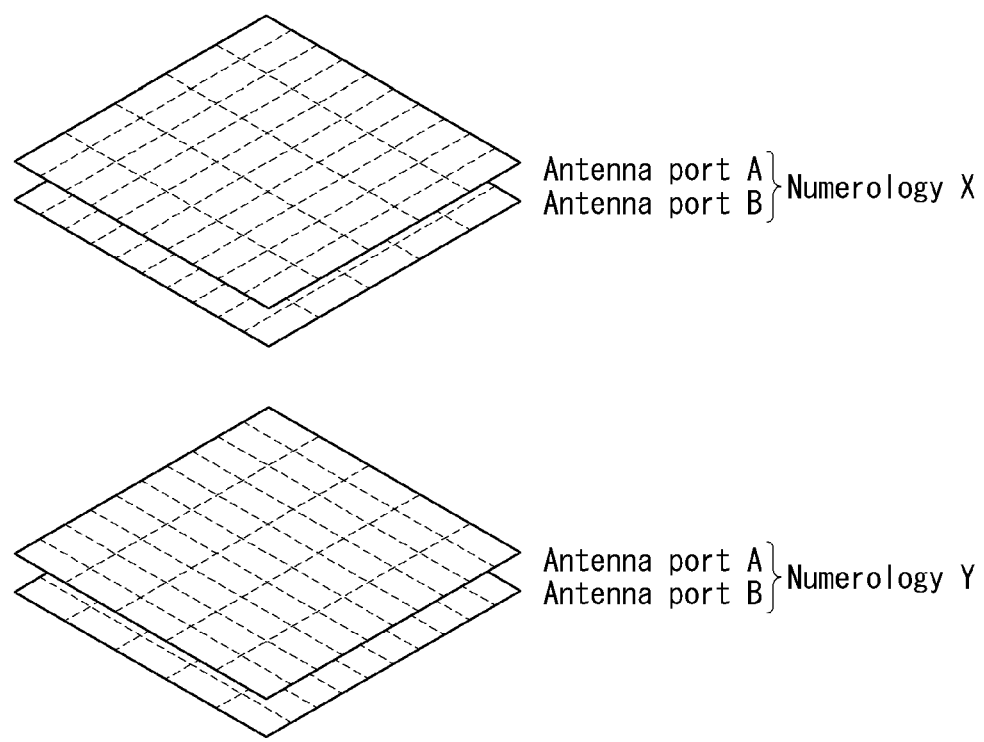
FIG. 8 illustrates examples of a resource grid per antenna port and numerology to which a method proposed in the disclosure may be applied.

In this case, as illustrated in FIG. 8, one resource grid may be configured per numerology μ and antenna port p.

FIG. 8 illustrates examples of a resource grid per antenna port and numerology to which a method proposed in the disclosure may be applied.

Each element of the resource grid for the numerology μ and the antenna port p is called a resource element and is uniquely identified by an index pair, (k,l̄), where k=0, . . . , $N_{RB}^{\mu} N_{sc}^{RB}-1$ is an index on a frequency domain, and l̄=0, . . . , $2^{\mu} N_{symb}^{(\mu)}-1$ refers to a location of a symbol in a subframe. The index pair (k,l̄) is used to refer to a resource element in a slot, where l=0, . . . , $N_{symb}^{\mu}-1$.

The resource element, (k,l̄) for the numerology μ and the antenna port p corresponds to a complex value $a_{k,l̄}^{(p,\mu)}$. When there is no risk for confusion or when a specific antenna port or numerology is not specified, the indexes p and μ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

In this case, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

In this case, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

Figure 9:
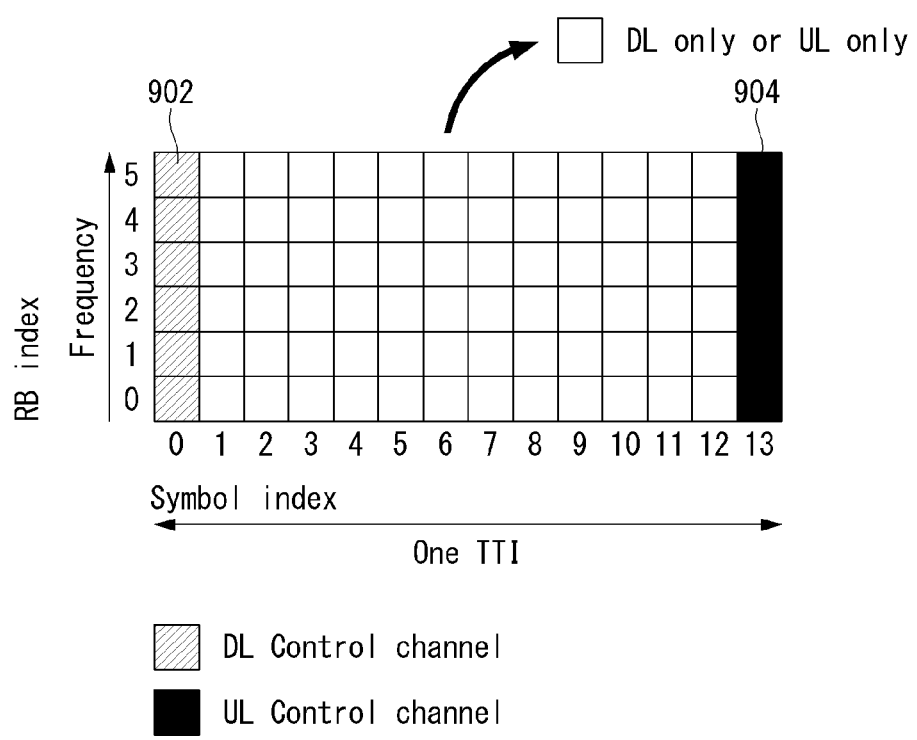
FIG. 9 illustrates an example of a self-contained structure to which a method proposed in the disclosure may be applied.

FIG. 9 illustrates an example of a self-contained structure to which a method proposed in the disclosure may be applied. FIG. 9 is merely for convenience of explanation and does not limit the scope of the disclosure.

Referring to FIG. 9, as in legacy LTE, it is assumed that one transmission unit (e.g., slot, subframe) consists of 14 orthogonal frequency division multiplexing (OFDM) symbols.

In FIG. 9, a region 902 means a downlink control region, and a region 904 means an uplink control region. Further, regions (i.e., regions without separate indication) other than the region 902 and the region 904 may be used for transmission of downlink data or uplink data.

That is, uplink control information and downlink control information may be transmitted in one self-contained slot. On the other hand, in case of data, uplink data or downlink data is transmitted in one self-contained slot.

When the structure illustrated in FIG. 9 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 9, a base station (e.g., eNodeB, eNB, gNB) and/or a user equipment (UE) (e.g., terminal) require a time gap for a process for converting a transmission mode into a reception mode or a process for converting a reception mode into a transmission mode. In relation to the time gap, if uplink transmission is performed after downlink transmission in the self-contained slot, some OFDM symbol(s) may be configured as a guard period (GP).

UE Procedure for Receiving Control Information

If a UE is configured with an SCG, the UE may need to apply the procedure, described in the pre-defined specification (e.g., 3GPP TS 38.213), to both an MCG and the SCG except PDCCH monitoring in the Type0/0A/2-PDCCH CSS set. In this case, the UE does not need to apply the procedure according to the pre-defined specification (e.g., 3GPP TS 38.213) to the SCG.

If the procedure is applied to an MCG, terms "secondary cell", "secondary cells", "serving cell" and "serving cells" in this paragraph may mean a secondary cell, secondary cells, a serving cell, and serving cells belonging to the MCG, respectively.

And/or if the procedure is applied to an SCG, terms "secondary cell", "secondary cells", "serving cell", and "serving cells" in this paragraph mean a secondary cell, secondary cells (except PSCell), a serving cell, and serving cells belonging to the SCG, respectively. In this paragraph, the term "primary cell" may mean the PSCell of an SCG.

If the monitoring of a UE means the decoding of each PDCCH candidate based on a monitored DCI format, the UE may monitor a PDCCH candidate set in one or more CORESETs on an active DL BWP on each activated serving cell configured as PDCCH monitoring based on a corresponding search space set.

If a UE receives ssb-PositionsInBurst in an SIB1 for PDCCH candidate monitoring in a slot and does not receives ssb-PositionsInBurst in ServingCellConfigCommon for a serving cell and the UE does not monitor PDCCH candidates in the Type0-PDCCH CSS set and at least one RE for a PDCCH candidate overlaps at least one RE corresponding to an SS/PBCH block index provided by ssb-PositionsInBurst of the SIB1, the UE may not need to monitor a PDCCH candidate.

And/or if a UE receives ssb-PositionsInBurst in ServingCellConfigCommo for a serving cell and the UE does not monitor a PDCCH candidate in the Type0-PDCCH CSS set and at least one RE for a PDCCH candidate overlaps at least one RE corresponding to an SS/PBCH block index provided by ssb-PositionsInBurst of ServingCellConfigCommon, the UE may not need to monitor a PDCCH candidate.

And/or if a UE monitors a PDCCH candidate for a Type0-PDCCH CSS configured in a serving cell based on a procedure described in a pre-defined specification (e.g., 3GPP TS 38.213), the UE may assume that an SS/PBCH block is not transmitted in an RE used to monitor a PDCCH candidate on a serving cell.

And/or if at least one RE of a PDCCH candidate on a serving cell overlaps at least one RE of lte-CRS-ToMatchAround, a UE may not need to monitor a PDCCH candidate.

If a UE indicates a carrier aggregation capability greater than 4 serving cells as a UE-NR-Capability, the UE may include an indication for a maximum number of PDCCH candidates, which may be monitored by the UE per slot, in the UE-NR-Capability when the UE is configured for a carrier aggregation operation over four or more cells. If a UE is not configured for an NR-DC operation, the UE may determine the capability to monitor a maximum number of PDCCH candidates per slot, which corresponds to a $N_{cells}^{cap}$ downlink cell.

In this case, if the UE does not provide pdcch-BlindDetectionCA, $N_{cells}^{cap}$ cells may be a maximum number of configured downlink cells. If not, $N_{cells}^{cap}$ may be a value of pdcch-BlindDetectionCA.

If a UE is configured for an NR-DC operation, the UE may determine the capability to monitor a maximum number of PDCCH candidates per slot, which corresponds to $N_{cells}^{cap}=N_{cells}^{MCG}$ downlink cells for an MCG in which cells is provided by pdcch-BlindDetectionMCG, and may determine the capability to monitor a maximum number of PDCCH candidates per slot, which corresponds to $N_{cells}^{cap}=N_{cells}^{SCG}$ downlink cells for an SCG in which $N_{cells}^{SCG}$ is provided by pdcch-BlindDetectionSCG. If a UE is configured for a carrier aggregation operation over four or more cells or a UE is configured for an NR-DC operation, when the UE is configured for a cell group, the UE may not expect that it will monitor the number of PDCCH candidates greater than a maximum number, derived from a corresponding value of $N_{cells}^{cap}$ per slot.

When a UE is configured for an NR-DC operation as a total number of $N_{NR-DC}^{DL,cells}$ downlink cells in both an MCG and an SCG, the UE may expect that a value satisfying the following will be provided in pdcch-BlindDetectionMCG and pdcch-BlindDetectionSCG.

If the UE reports pdcch-BlindDetectionCA, pdcch-BlindDetectionMCG+pdcch-BlindDetectionSCG<=pdcch-BlindDetectionCA or If the UE does not report pdcch-BlindDetectionCA, pdcch-BlindDetectionMCG+pdcch-BlindDetectionSCG<=$N_{NR-DC}^{DL,cells}$ If the UE is configured for an NR-DC operation, the UE may indicate maximum values of pdcch-BlindDetectionMCG and pdcch-BlindDetectionSCG through pdcch-BlindDetectionMCG-UE and pdcch-BlindDetectionSCG-UE, respectively. If the UE reports pdcch-BlindDetectionCA, a value range of pdcch-BlindDetectionMCG-UE or pdcch-BlindDetectionSCG-UE is [1, . . . , pdcch-BlindDetectionCA-1], pdcch-BlindDetectionMCG-UE+pdcch-BlindDetectionSCG-UE>=pdcch-BlindDetectionCA.

If not, if $N_{NR-DC,max}^{DL,cells}$ is a maximum number of downlink cells which may be configured in both an MCG and an SCG as described in a pre-defined specification (e.g., 3GPP TS 38.133), a value range of pdcch-BlindDetectionMCG-UE or pdcch-BlindDetectionSCG-UE is [1, 2, 3], pdcch-BlindDetectionMCG-UE+pdcch-BlindDetectionSCG-UE>=$N_{BNR-DC,max}^{DL,cells}$.

UE Procedure for Determining Physical Downlink Control Channel Allocation

A PDCCH candidate set to be monitored by a UE may be defined as a PDCCH search space set. The search space set may be a CSS set or a USS set. The UE may monitor a PDCCH candidate in one or more of the following search space sets.

a Type0-PDCCH CSS set configured by searchSpaceZero of PDCCH-ConfigCommon for a DCI format having CRC scrambled by pdcch-ConfigSIB1 in an MIB or by searchSpaceSIB1 of PDCCH-ConfigCommon or by an SI-RNTI in the primary cell of an MCG, a Type0A-PDCCH CSS set configured by searchSpaceOtherSystemInformation of PDCCH-ConfigCommon for a DCI format scrambled by CRC by an SI-RNTI in the primary cell of an MCG, a Type1-PDCCH CSS set configured by ra-SearchSpace of PDCCH-ConfigCommon for a DCI format having CRC scrambled by the RA-RNTI or TC-RNTI of a primary cell, a Type2-PDCCH CSS set configured by paging-SearchSpace of PDCCH-ConfigCommon for a DCI format having CRC scrambled by a P-RNTI in the primary cell of an MCG, a Type3-PDCCH CSS set configured as SearchSpace in PDCCH-Config as searchSpaceType=common with respect to a DCI format having CRC scrambled by an INT-RNTI, an SFI-RNTI, a TPC-PUSCH-RNTI, a TPC-PUCCH-RNTI or a TPC-SRS-RNTI and by a C-RNTI, an MCS-C-RNTI or a CS-RNTI for only a primary cell, and a USS set configured by SearchSpace in PDCCH-Config as searchSpaceType=UE-Specific with respect to a DCI format having CRC scrambled by a C-RNTI, an MCS-C-RNTI, an SP-CSI-RNTI or a CS-RNTI(s).

In the case of a DL BWP, if searchSpace-SIB1 for a Type0-PDCCH CSS configured by PDCCH-ConfigCommon is not provided to the UE, the UE may not monitor a PDCCH candidate for the Type0-PDCCH CSS configured on the DL BWP. A Type0-PDCCH CSS set may be defined by the number of PDCCH candidates per CCE aggregation level and CCE aggregation level given in Table 4. If an active DL BWP and an initial DL BWP have the same SCS and the same CP length and the active DL BWP includes all the RBs of a CORESET having an index 0 or the active DL BWP is an initial DL BWP, a CORESET configured by the Type0-PDCCH CSS set may have a CORESET index 0, and the Type0-PDCCH CSS set may have a search space set index 0.

In the case of a DL BWP, if a UE is not provided with searchSpaceOtherSystemInformation for a Type0A-PDCCH CSS set, the UE may not monitor a PDCCH for the Type0A-PDCCH CSS configured in the DL BWP. A CCE aggregation level and the number of PDCCH candidates per CCE aggregation level for the Type0A-PDCCH CSS set may be given in Table 4.

In the case of a DL BWP and a Type1-PDCCH CSS set, a UE may be provided with a configuration for a search space by ra-SearchSpace. If a UE set is not provided with a Type3-PDCCH CSS set or USS and the UE receives a C-RNTI, the UE may monitor a PDCCH candidate for a DCI format 0_0 and a DCI format 1_0 along with a CRC scrambled by a C-RNTI in the Type1-PDCCH CSS set.

If a UE is not provided with pagingSearchSpace for a Type2-PDCCH CSS set, the UE may not monitor a PDCCH for the Type2-PDCCH CSS configured on a DL BWP. A CCE aggregation level and the number of PDCCH candidates per CCE aggregation level for the Type2-PDCCH CSS set may be the same as Table 4.

If a UE is provided with a value 0 in searchSpaceID of PDCCH-ConfigCommon for a Type0/0A/2-PDCCH CSS set, the UE may determine monitoring timing for PDCCH candidate of the Type0/0A/2-PDCCH CSS set as described in a pre-defined specification (e.g., 3GPP TS 38.213). In the case of a DCI format having CRC scrambled by a C-RNTI, a UE may monitor a corresponding PDCCH candidate only at monitoring timing related to an SS/PBCH block.

If a UE monitors a PDCCH candidate for a DCI format having CRC scrambled by a C-RNTI and the UE is provided with a value not 0 with respect to searchSpaceID of PDCCH-ConfigCommon for a Type0/0A/2-PDCCH CSS set, the UE may determine a monitoring occasion for the PDCCH candidates of the Type0/0A/2-PDCCH CSS set based on a search space set associated with a value of searchSpaceID.

A UE may assume whether a TCI state indicative of quasi co-location information of a DM-RS antenna port for PDCCH reception is not provided to the UE in a CORESET when DM-RS antenna port related to the PDCCH reception of the CORESET configured by pdcch-ConfigSIB1 in an MIB and corresponding PDSCH reception and a corresponding SS/PBCH block have a quasi-co-location relation in relation to an average gain, QCL-TypeA and QCL-TypeD attributes and a pre-defined specification (e.g., 3GPP TS 38.214) is applied. A value of DM-RS scrambling sequence initialization may be a cell ID. A SCS may be provided by subCarrierSpacingCommon by the MIB.

If a DM-RS for monitoring a PDCCH in a Type1-PDCCH CSS set does not have the same QCL-TypeD characteristics as a DM-RS for monitoring a PDCCH in a Type0/0A/2/3-PDCCH CSS set or USS set for a single cell operation or a carrier aggregation operation in the same frequency band, a UE may not expect that it will monitor a PDCCH in the Type0/0A/2/3-PDCCH CSS set or USS set. If a PDCCH or a related PDSCH overlaps a PDCCH in at least one symbol, a UE may monitor a PDCCH in a Type1-PDCCH CSS set or as a related PDSCH.

If a UE is provided with one or more search space sets, and a C-RNTI, an MCS-C-RNTI, or a CS-RNTI based on corresponding one or more of searchSpaceZero, searchSpaceSIB1, searchSpaceOtherSystemInformation, pagingSearchSpace, and ra-SearchSpace, the UE may monitor a PDCCH candidate for a DCI format 00 and a DCI format 10 based on CRC scrambled by a C-RNTI, an MCS-C-RNTI or a CS-RNTI in one or more search space sets within a slot. In this case, the UE may monitor a PDCCH candidate for at least the DCI format 0_0 or DCI format 1_0 based on CRC scrambled by an SI-RNTI, an RA-RNTI or a P-RNTI.

If a UE is provided with one or more search space sets, and an SI-RNTI, a P-RNTI, an RA-RNTI, an SFI-RNTI, an INT-RNTI, a TPC-PUSCH-RNTI, a TPC-PUCCH-RNTI, or a TPC-SRS-RNTI based on corresponding one or more of searchSpaceZero, searchSpaceSIB1, searchSpaceOtherSystemInformation, pagingSearchSpace, ra-SearchSpace or a CSS set configured by PDCCH-Config, the UE may not expect that it will process information from one or more DCI formats having CRC scrambled by an RNTI per slot with respect to one of RNTIs.

Table 4 illustrates CCE aggregation levels and maximum numbers of PDCCH candidates per CCE aggregation level for a CSS set configured by searchSpace-SIB1.

TABLE 4

| CCE Aggregation Level | Number of Candidates |
| --- | --- |
| 4 | 4 |
| 8 | 2 |
| 16 | 1 |

If monitoringSymbolsWithinSlot indicates that a UE has to monitor a PDCCH in the subset of a maximum of the same 3 consecutive symbols in all slots with respect to the UE, the UE may not expect that the subset will be configured as a PDCCH SCS other than 15 kHz if the subset includes at least one symbol after a third symbol.

A UE may not expect that the first symbol and a plurality of consecutive symbols for a CORESET that enables a PDCCH candidate to be mapped to the symbols of different slots will be provided.

A UE may not expect two PDCCH monitoring occasions for the same search space set or another search space set on an active DL BWP in the same CORESET separated by the number of symbols not 0 smaller than CORESET duration.

A UE may determine a PDCCH monitoring occasion on an active DL BWP from a PDCCH monitoring span within a slot, a PDCCH monitoring offset and a PDCCH monitoring pattern. With respect to a search space set S, if ($n_f \cdot N_{slot}^{frame,\mu} + n_{s,f}^{\mu} - o_s$) mod $k_s$=0, a UE may determine that a PDCCH monitoring occasion(s) is present in a slot having a number $n_{s,f}^{\mu}$ in a frame having a number $n_f$. The UE may monitor PDCCH candidates for the search space set S with respect to consecutive slots $T_s$, starting from a slot $n_{s,f}^{\mu}$, and may not monitor PDCCH candidates for the search space set s with respect to $k_s - T_s$ consecutive slots.

The USS of a CCE aggregation level L∈{1, 2, 4, 8, 16} may be defined by a PDCCH candidate set for a CCE aggregation level L.

If a UE is configured with CrossCarrierSchedulingConfig for a serving cell, a carrier indicator field value may correspond to a value indicated by CrossCarrierSchedulingConfig.

If a UE is not configured with a carrier indicator field with respect to the active DL BWP of a serving cell in which the UE monitors a PDCCH candidate in a USS, the UE may monitor PDCCH candidates without a carrier indicator field. If a UE is configured with a carrier indicator field with respect to the active DL BWP of a serving cell in which the UE monitors a PDCCH candidate in a USS, the UE may monitor PDCCH candidates using the carrier indicator field.

If a UE is configured to monitor PDCCH candidates using a carrier indicator field corresponding to a secondary cell in another serving cell, the UE may not expect that it will monitor a PDCCH candidate in the active DL BWP of a secondary cell. With respect to the active DL BWP of a serving cell in which a UE monitors PDCCH candidates, the UE may monitor a PDCCH candidate for at least the same serving cell.

A UE may expect that it will monitor a PDCCH candidate for a maximum size of 4 DCI formats including a maximum of three DCI formats based on CRC scrambled by a C-RNTI per serving cell. The UE may count a plurality of sizes for a DCI format per serving cell based on a plurality of configured PDCCH candidates in each search space set for a corresponding active DL BWP.

In the CORESET P of an active DL BWP for a serving cell $n_{CI}$, a PDCCH candidate having an index $m_{s_j,n_{CI}}$ for a search space set $s_j$ may not be counted for monitoring using a CCE set. If a PDCCH candidate having an index $m_{s_i,n_{CI}}$ for a search space set $s_i < s_j$ is present or a PDCCH candidate having the index $m_{s_j,n_{CI}}$ and $n_{s_j,n_{CI}} < m_{s_j,n_{CI}}$ is present, a PDCCH candidate may have the same scrambling and a DCI format corresponding to the PDCCH candidate may have the same size in the CORESET P of an active DL BWP for a serving cell $N_{CI}$ using the same CCE set. If not, a PDCCH candidate having an index $m_{s_j,n_{CI}}$ may be counted for monitoring.

Table 5 provides a maximum number of monitored PDCCH candidates (PDCCH) with respect to a DL BWP having an SCS configuration μ for a UE per slot for the purpose of an operation with a single serving cell.

Table 5 illustrates a maximum number $M_{PDCCH}^{max,slot,\mu}$ of monitored PDCCH candidates per slot with respect to a DL BWP having an SCS configuration μ∈{0, 1, 2, 3} for a single serving cell.

TABLE 5

| μ | Maximum number of PDCCH candidates monitored per slot and per serving cell $M_{PDCCH}^{max\ slot,\ \mu}$ |
|---|---|
| 0 | 44 |
| 1 | 36 |
| 2 | 22 |
| 3 | 20 |

Table 6 may provide a maximum number $C_{PDCCH}^{max,slot,\mu}$ of non-overlap CCEs for a DL BWP that uses an SCS configuration μ in which a UE expects to monitor a corresponding PDCCH candidate per slot for an operation with a single serving cell.

If CCEs correspond to different CORESET indices or the first different symbols for the reception of each PDCCH candidate, CCEs for the PDCCH candidate may not overlap.

Table 6 illustrates a maximum number of CCEs $C_{PDCCH}^{max,slot,\mu}$ that do not overlap per slot with respect to a DL BWP having an SCS configuration μ∈{0, 1, 2, 3} for a single serving cell.

TABLE 6

| μ | Maximum number of non-overlap CCEs per slot and per serving cell $C_{PDCCH}^{max\ slot,\ \mu}$ |
|---|---|
| 0 | 56 |
| 1 | 56 |
| 2 | 48 |
| 3 | 32 |

If a UE is configured with $N_{cells}^{DL,\mu}$ downlink cells having DL BWPs having an SCS configuration μ (in this case, $$\sum_{\mu=0}^{3} N_{cells}^{DL,\mu} \leq N_{cells}^{cap}\Bigg),$$

the UE may not need to monitor $m_{PDCCH}^{total,slot,\mu} = M_{PDCCH}^{max,slot,\mu}$ PDCCH candidates or more or $C_{PDCCH}^{total,slot,\mu} = C_{PDCCH}^{max,slot,\mu}$ non-overlap CCEs or more per slot with respect to each scheduled cell on the active DL BWP of a scheduling cell.

If a UE is configured with $N_{cells}^{DL,\mu}$ downlink cells having DL BWPs having an SCS configuration μ (in this case, $$\sum_{\mu=0}^{3} N_{cells}^{DL,\mu} > N_{cells}^{cap}\Bigg),$$

the DL BWP of an activated cell is the active DL BWP of the activated cell, and the DL BWP of a deactivated cell is a DL BWP having an index provided by firstActiveDownlinkBWP-Id for the deactivated cell, the UE may not need to monitor $$M_{PDCCH}^{total,slot,\mu} \Bigg\lfloor N_{cells}^{cap} \cdot M_{PDCCH}^{max,slot,\mu} \cdot N_{cells}^{DL,\mu} \Bigg/ \sum_{j=0}^{3} N_{cell}^{DL,j} \Bigg\rfloor$$

PDCCH candidates or more or $$C_{PDCCH}^{total,slot,\mu} = \Bigg\lfloor N_{cells}^{cap} \cdot C_{PDCCH}^{max,slot,\mu} \cdot N_{cells}^{DL,\mu} \Bigg/ \sum_{j=0}^{3} N_{cells}^{DL,j} \Bigg\rfloor$$

non-overlap CCEs or more per slot on the active DL BWP(s) of a scheduled cell(s) from $N_{cells}^{DL,\mu}$ downlink cells.

With respect to each scheduled cell, a UE may not need to monitor $\min(M_{PDCCH}^{max,slot,\mu}, M_{PDCCH}^{total,slot,\mu})$ PDCCH candidates or more or $\min(C_{PDCCH}^{max,slot,\mu}, C_{PDCCH}^{total,slot,\mu})$ non-overlap CCEs or more per slot on an active DL BWP having the SCS configuration of a scheduled cell.

A UE may not expect that monitored PDCCH candidates exceeding a corresponding maximum number per slot and configured CSS sets reaching a corresponding total number per scheduled cell of non-overlap CCEs per slot will be present.

With respect to the same cell scheduling or cross-carriers scheduling having DL BWPs in which a scheduling cell and a scheduled cell(s) have the same SCS configuration μ, a UE may not expect that the number of PDCCH candidates and the corresponding number of PDCCH candidates per slot on a secondary cell will be greater than a corresponding number that may be monitored by the UE on a secondary cell per slot.

The number of PDCCH candidates and the number of non-overlap CCEs per slot for monitoring may be separately counted for each scheduled cell with respect to cross-carriers scheduling.

With respect to all search space sets within a slot n, a set of CSS sets having cardinality of $I_{css}$ may be indicated as $S_{css}$, a set of USS sets having cardinality of $J_{uss}$ may be indicated as $S_{uss}$. The location of the USS sets $S_j$ ($0 \le j \le J_{uss}$) in $S_{uss}$ may follow ascending order of a search space set index.

The number of PDCCH candidates counted during monitoring for a CSS set $S_{css}(i)$ may be indicated as $M_{S_{css}(i)}^{(L)}$ ($0 \le i < I_{css}$), and the number of PDCCH candidates counted during monitoring for a USS set $S_{uss}(j'$. may be indicated as $M_{S_{uss}(j)}^{(L)}$ ($0 \le j < J_{uss}$).

With respect to CSS sets, a UE may monitor $$M_{PDCCH}^{CSS} = \sum_{i=0}^{I_{css}-1} \sum_{L} M_{S_{css}(i)}^{(L)}$$

PDCCH candidates that require a total number $C_{PDCCH}^{CSS}$ or non-overlap CCEs within a slot.

A UE may allocate PDCCH candidates for monitoring to USS sets for a primary cell having an active DL BWP including an SCS configuration μ in a slot n based on a pseudo-code. The UE may not expect that it will monitor a PDCCH in the USS set without the allocated PDCCH candidates for monitoring.

A set of non-overlap CCEs for a search space set $S_{uss}(j)$ may be indicated as $V_{CCE}(S_{uss}(j))$, and cardinality of $V_{CCE}(S_{uss}(j))$ may be indicated as $C(V_{CCE}(S_{uss}(j)))$. In this case, the non-overlap CCEs for the search space set $S_{uss}(j)$ may be determined by considering allocated PDCCH candidates for monitoring for CCS sets and PDCCH candidates for monitoring allocated for all the search space sets $S_{uss}(k)$ ($0 \le k \le j$).

With respect to a scheduled cell, a UE may expect that it will receive a maximum of 16 PDCCHs for DCI formats 1_0 or 1_1 based on CRC scrambled by a C-RNTI, a CS-RNTI, or an MCS-RNTI that schedules 16 PDSCH receptions indicating that the UE has not received any corresponding PDSCH symbol and a maximum of 16 PDCCHs for a DCI format 0_0 or format 0_1 using CRC scrambled by a C-RNTI, a CS-RNTI, or an MCS-RNTI that schedules 16 PUSCH transmissions indicating that the UE has not transmitted any corresponding PUSCH symbol.

When a UE detects a DCI format having inconsistent information, the UE may discard all of pieces of information in the DCI format.

A UE configured with a bandwidth part indicator in a DCI format 0_1 or format 1_1 may determine DCI information which may be applied to each of a new active DL BWP or UL BWP as described in a pre-defined specification (e.g., 3GPP TS 38.213) in the case of an active DL BWP or active UL BWP change.

If a UE is not configured with PUSCH and/or PUCCH transmission in a serving cell $c_2$ with respect to an unpaired spectrum operation, if the PDCCH overlaps SRS transmission (including any interruption due to an uplink or downlink RF returning time) within a time in the serving cell $c_2$ and the UE is incapable of simultaneous reception and transmission in a serving cell $c_1$ and the serving cell $c_2$, the UE may not expect to monitor a PDCCH in the serving cell $c_1$.

If a UE is provided with resource blocks and symbolsInResourceBlock in RateMatchPattern or the UE is additionally provided with periodicityAndPattern in RateMatchPattern, the UE may determine an RB set in the symbols of a slot which cannot use PDSCH reception as described in a pre-defined specification (e.g., 3GPP TS 38.214). If a PDCCH candidate in the slot is mapped to one or more Res overlapping the REs of any RB in the RB set in the symbols of the slot, the UE may not expect to monitor a PDCCH candidate.

Initial Access (IA) Procedure

Synchronization Signal Block (SSB) Transmission and Related Operation

Figure 10:
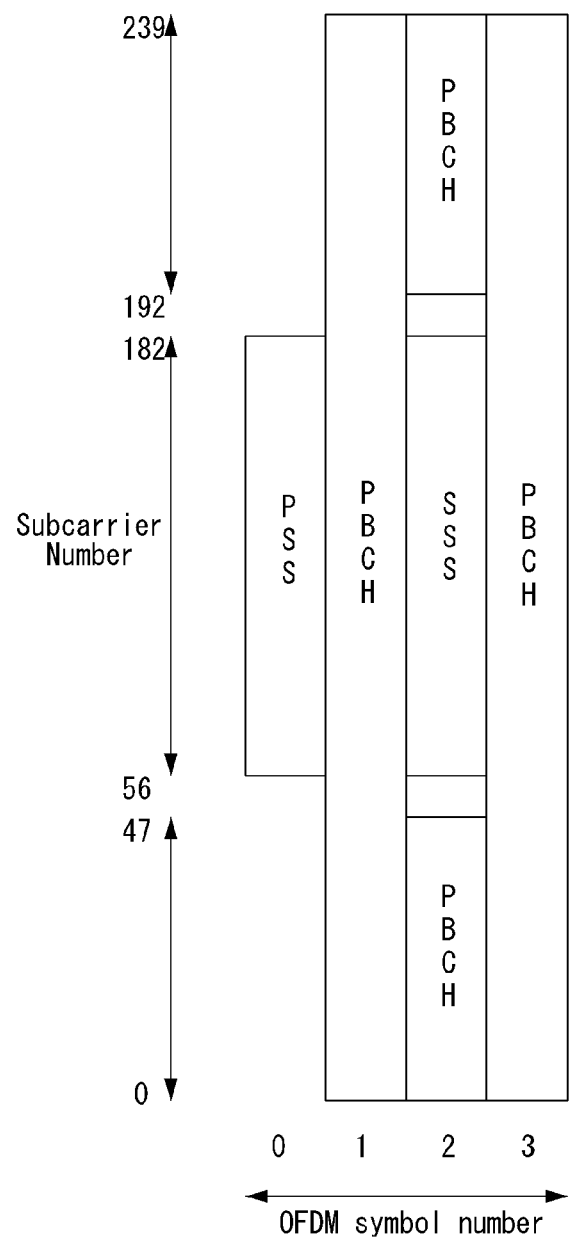
FIG. 10 illustrates a structure of a SSB.

FIG. 10 illustrates an SSB structure. A UE may perform cell search, system information acquisition, beam alignment for initial access, DL measurement, etc. based on an SSB. The SSB is mixedly used with synchronization signal (SS)/physical broadcast channel (PBCH) block.

Referring to FIG. 10, the SSB consists of PSS, SSS, and PBCH. The SSB consists of four consecutive OFDM symbols, and the PSS, the PBCH, the SSS/PBCH, and the PBCH are transmitted per OFDM symbol. The PSS and the SSS each consist of one OFDM symbol and 127 subcarriers, and the PBCH consists of 3 OFDM symbols and 576 subcarriers. Polar coding and quadrature phase shift keying (QPSK) is applied to the PBCH. The PBCH consists of a data RE and a demodulation reference signal (DMRS) RE for each OFDM symbol. Three DMRS REs exist for each RB, and three data REs exist between DMRS REs.

Cell Search

The cell search refers to a process in which a UE acquires time/frequency synchronization of a cell and detects a cell identifier (ID) (e.g., physical layer cell ID (PCID)) of the cell. The PSS is used to detect a cell ID in a cell ID group, and the SSS is used to detect a cell ID group. The PBCH is used to detect an SSB (time) index and a half-frame.

The cell search process of the UE may be summarized as the following Table 7.

TABLE 7

| Type of Signals | | Operations |
| --- | --- | --- |
| 1st step | PSS | SS/PBCH block (SSB) symbol timing acquisition Cell ID detection within a cell ID group (3 hypothesis) |

TABLE 7-continued

| Type of Signals | | Operations |
|---|---|---|
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/ Search space configuration |
| 5th Step | PDCCH and PDSCH | Cell access information RACH configuration |

There are 336 cell ID groups, and there are three cell IDs for each cell ID group. A total of 1008 cell IDs are present, and the cell ID may be defined by the following Equation 3.

$$N_{ID}^{cell} = 3N_{ID}^{(1)} + N_{ID}^{(2)} \quad \text{[Equation 3]}$$

where $N_{ID}^{(1)} \in \{0, 1, \ldots, 335\}$, and $N_{ID}^{(2)} \in \{0, 1, 2\}$.

Here, NcellID denotes a cell ID (e.g., PCID). N(1)ID denotes a cell ID group and is provided/acquired through the SSS. N(2)ID denotes a cell ID in the cell ID group and is provided/acquired through the PSS.

PSS sequence dPSS(n) may be defined to satisfy the following Equation 4.

$$d_{PSS}(n) = 1 - 2x(m)$$

$$m = (n + 43N_{ID}^{(2)}) \bmod 127$$

$$0 \leq n < 127 \quad \text{[Equation 4]}$$

where $x(i+7) = (x(i+4) + x(i)) \bmod 2$, and
$[x(6) \; x(5) \; x(4) \; x(3) \; x(2) \; x(1) \; x(0)] = [1\;1\;1\;0\;1\;1\;0]$.

SSS sequence dSSS(n) may be defined to satisfy the following Equation 5.

$$d_{SSS}(n) = [1 - 2x_0((n + m_0) \bmod 127)][1 - 2x_1((n + m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \leq n < 127$$

$$x_0(i+7) = (x_0(i+4) + x_0(i)) \bmod 2$$

where $x_1(i+7) = (x_1(i+1) + x_1(i)) \bmod 2$, and $[x_0(6) \; x_0(5) \; x_0(4) \; x_0(3) \; x_0(2) \; x_0(1) \; x_0(0)] =$
$[0\;0\;0\;0\;0\;0\;1]$ $[x_1(6) \; x_1(5) \; x_1(4) \; x_1(3) \; x_1(2) \; x_1(1) \; x_1(0)] =$
$[0\;0\;0\;0\;0\;0\;1]$.

Figure 11:
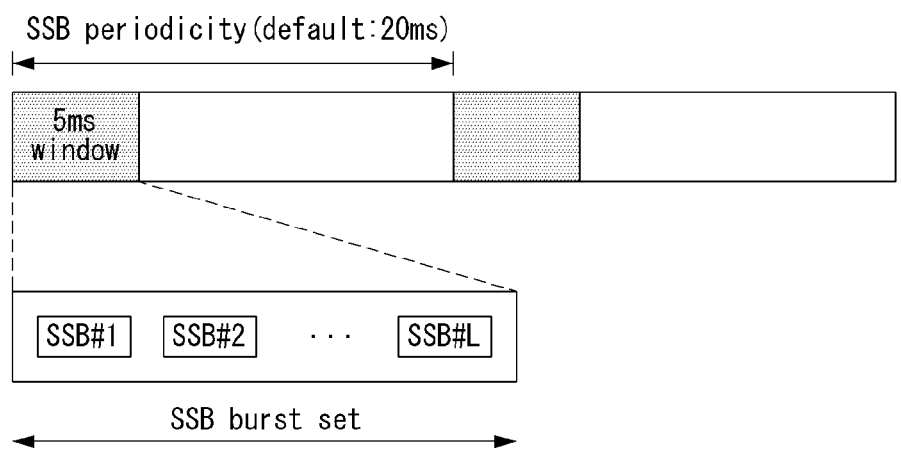
FIG. 11 illustrates an example of SSB transmission.

FIG. 11 illustrates SSB transmission.

Referring to FIG. 11, the SSB is periodically transmitted according to SSB periodicity. An SSB basic periodicity assumed by the UE in c is defined as 20 ms. After cell access, the SSB periodicity may be configured by one of {5 ms, 10 ms, 20 ms, 40 ms, 80 ms, 160 ms} by the network (e.g., eNB). At a beginning part of the SSB periodicity, a set of SSB bursts is constructed. The SSB burst set may consist of 5 ms time window (i.e., half-frame), and the SSB may be transmitted up to L times within the SS burst set. L which is the maximum number of transmissions of the SSB may be given as follows according to a frequency band of a carrier. One slot includes up to two SSBs.

For frequency range up to 3 GHz, L=4
For frequency range from 3 GHz to 6 GHz, L=8
For frequency range from 6 GHz to 52.6 GHz, L=64

A time location of an SSB candidate within the SS burst set may be defined as follows according to SCS. The time locations of the SSB candidates are indexed from 0 to L−1 (SSB indexes) in chronological order within the SSB burst set (i.e., half-frame).

Case A—15 kHz SCS: An index of a start symbol of the candidate SSB is given as {2, 8}+14*n. When the carrier frequency is 3 GHz or less, n=0, 1. When the carrier frequency is 3 GHz to 6 GHz, n=0, 1, 2, 3.

Case B—30 kHz SCS: An index of a start symbol of the candidate SSB is given as {4, 8, 16, 20}+28*n. When the carrier frequency is 3 GHz or less, n=0. When the carrier frequency is 3 GHz to 6 GHz, n=0, 1.

Case C—30 kHz SCS: An index of a start symbol of the candidate SSB is given as {2, 8}+14*n. When the carrier frequency is 3 GHz or less, n=0, 1. When the carrier frequency is 3 GHz to 6 GHz, n=0, 1, 2, 3.

Case D—120 kHz SCS: An index of a start symbol of the candidate SSB is given as {4, 8, 16, 20}+28*n. When the carrier frequency is greater than 6 GHz, n=0, 1, 2, 3, 5, 6, 7, 8, 10, 11, 12, 13, 15, 16, 17, 18.

Case E—240 kHz SCS: An index of a start symbol of the candidate SSB is given as {8, 12, 16, 20, 32, 36, 40, 44}+56*n. When the carrier frequency is greater than 6 GHz, n=0, 1, 2, 3, 5, 6, 7, 8.

Figure 12:
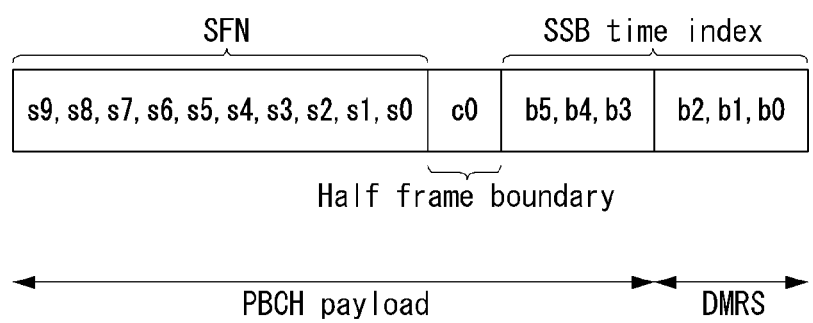
FIG. 12 illustrates an example of acquiring information for DL time synchronization.

FIG. 12 illustrates that a UE acquires information for DL time synchronization.

The UE may acquire DL synchronization by detecting the SSB. The UE may identify a structure of the SSB burst set based on the detected SSB index, and thus may detect a symbol/slot/half-frame boundary. The number of frame/half-frame to which the detected SSB belongs may be identified using SFN information and half-frame indication information.

Specifically, the UE may acquire 10-bit system frame number (SFN) information (s0 to s9) from the PBCH. 6 bits of the 10-bit SFN information are obtained from a master information block (MIB), and the remaining 4 bits are obtained from a PBCH transport block (TB).

Next, the UE may acquire 1-bit half-frame indication information (c0). When the carrier frequency is 3 GHz or less, the half-frame indication information may be implicitly signaled using PBCH DMRS. The PBCH DMRS indicates 3-bit information by using one of eight PBCH DMRS sequences. Thus, for L=4, 1 bit which remains after indicating the SSB index among 3 bits which may be indicated using eight PBCH DRMS sequences may be used for half frame indication.

Last, the UE may acquire the SSB index based on a DMRS sequence and a PBCH payload. SSB candidates are indexed from 0 to L−1 in chronological order within the SSB burst set (i.e., half-frame). For L=8 or 64, least significant bit (LSB) 3 bits of the SSB index may be indicated using eight different PBCH DMRS sequences (b0 to b2). For L=64, most significant bit (MSB) 3 bits of the SSB index are indicated through the PBCH (b3 to b5). For L=2, LSB 2 bits of the SSB index may be indicated using four different PBCH DMRS sequences (b0 and b1). For L=4, 1 bit which remains after indicating the SSB index among 3 bits which may be indicated using eight PBCH DRMS sequences may be used for the half frame indication (b2).

System Information Acquisition

Figure 13:
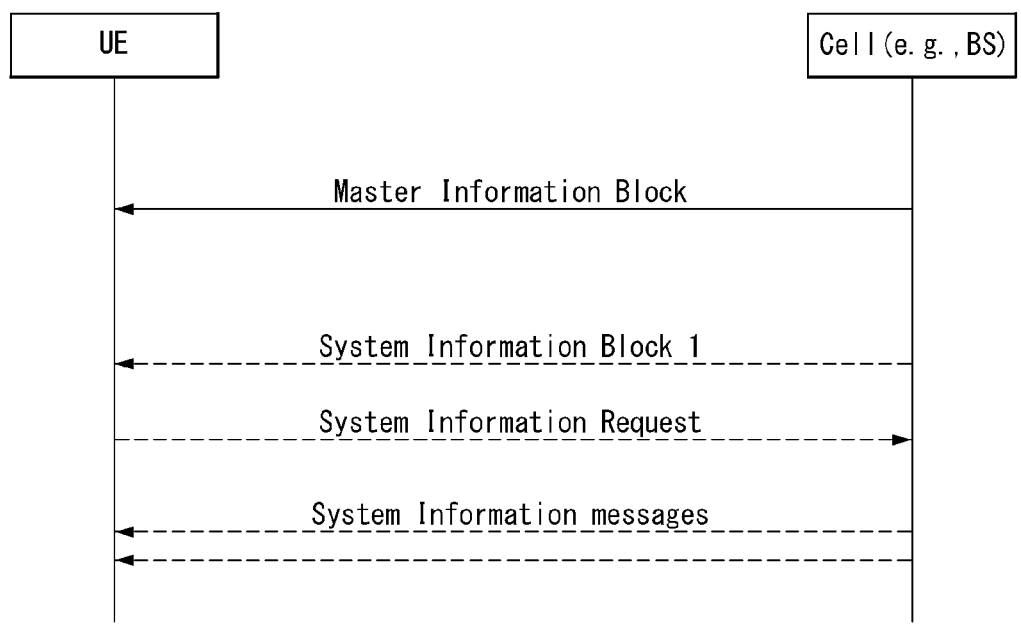
FIG. 13 illustrates a process of acquiring system information (SI).

FIG. 13 illustrates a process of acquiring system information (SI). The UE may acquire AS-/NAS-information through an SI acquisition process. The SI acquisition process may be applied to the UE which is in an RRC_IDLE state, an RRC_INACTIVE state, and an RRC_CONNECTED state.

The SI is divided into a master information block (MIB) and a plurality of system information blocks (SIB). SI other than the MIB may be referred to as remaining minimum system information (RMSI). The following may be referred to for details.

The MIB includes information/parameters related to SystemInformationBlock1 (SIB1) reception and is transmitted via the PBCH of the SSB. In the initial cell selection, the UE assumes that a half frame with the SSB is repeated with a periodicity of 20 ms. The UE may check whether a control resource set (CORESET) for a Type0-PDCCH common search space exists based on the MIB. The Type0-PDCCH common search space is a kind of PDCCH search space and is used to transmit a PDCCH for scheduling an SI message. If there is a Type0-PDCCH common search space, the UE may determine (i) a plurality of consecutive RBs and one or more consecutive symbols constituting the CORESET, and (ii) a PDCCH occasion (i.e., a time domain location for PDCCH reception) based on information (e.g., pdcch-ConfigSIB1)) within the MIB. If there is no Type0-PDCCH common search space, pdcch-ConfigSIB1 provides information for a frequency location where SSB/SIB1 exists and a frequency range where the SSB/SIB1 does not exist.

The SIB1 contains information related to availability and scheduling (e.g., transmission periodicity, SI-window size) of the remaining SIBs (hereinafter, referred to as SIBx, where x is an integer of 2 or more). For example, the SIB1 may inform whether the SIBx is periodically broadcasted or whether the SIBx is provided by a request of the UE according to an on-demand scheme. If the SIBx is provided by the on-demand scheme, the SIB1 may include information which the UE requires to perform an SI request. The SIB1 is transmitted via the PDSCH, the PDCCH for scheduling the SIB1 is transmitted through the Type0-PDCCH common search space, and the SIB1 is transmitted via the PDSCH indicated by the PDCCH.

The SIBx is included in the SI message and is transmitted via the PDSCH. Each SI message is sent within a time window (i.e., SI-window) which periodically occurs.

Channel Measurement and Rate-Matching

Figure 14:
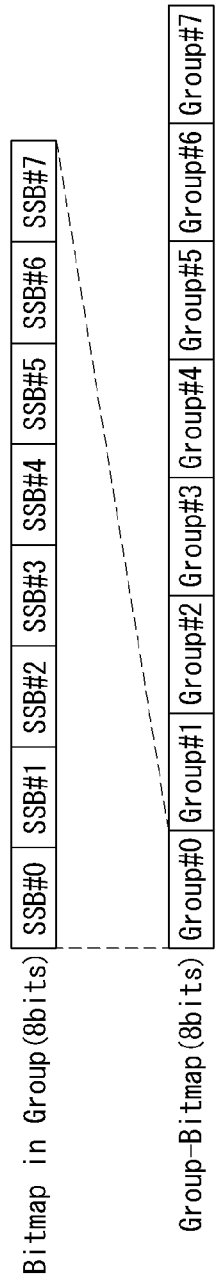
FIG. 14 illustrates a method of informing an actually transmitted SSB.

FIG. 14 illustrates a method of informing an actually transmitted SSB (SSB_tx).

Up to L SSBs may be transmitted within an SSB burst set, and the number/location of SSBs which are actually transmitted may vary per base station/cell. The number/location of SSBs which are actually transmitted is used for rate-matching and measurement, and information on the actually transmitted SSBs is indicated as follows.

In case related to rate-matching: it may be indicated via UE-specific RRC signaling or RMSI. The UE-specific RRC signaling includes a full (e.g., length L) bitmap in both below 6 GHz and above 6 GHz frequency ranges. The RMSI includes the full bitmap below 6 GHz and includes a compression type bitmap above 6 GHz as illustrated in FIG. 14. Specifically, information on the actually transmitted SSBs may be indicated using group-bitmap (8 bits)+in-group bitmap (8 bits). Herein, resources (e.g., REs) indicated via UE-specific RRC signaling or RMSI may be reserved for SSB transmission, and the PDSCH/PUSCH may be rate-matched by considering SSB resources.

In case related to measurement: When the network is in an RRC connected mode, the network (e.g., base station) may indicate an SSB set to be measured in a measurement duration. The SSB set may be indicated for each frequency layer. When there is no indication for the SSB set, a default SSB set is used. The default SSB set includes all SSBs in the measurement duration. The SSB set may be indicated using the full (e.g., length L) bitmap of the RRC signaling. When the network is in an RRC idle, the default SSB set is used.

Random Access Procedure

Figure 15:
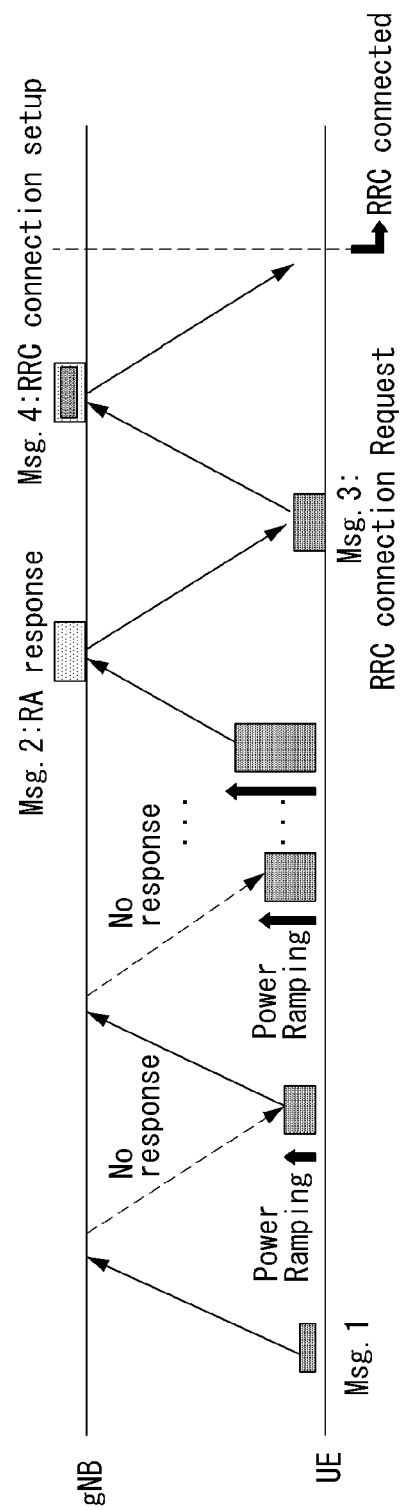
FIG. 15 illustrates an example of a random access procedure.

A random access procedure of a UE may be summarized as Table 8 and FIG. 15.

TABLE 8

| | Type of Signals | Operations/Information acquired |
|---|---|---|
| 1$^{st}$ step | PRACH preamble in UL | Initial beam acquisition Random election of RA-preamble ID Timing alignment information |
| 2$^{nd}$ step | Random Access Response on DL-SCH | RA-preamble ID Initial UL grant, Temporary C-RNTI |
| 3$^{rd}$ step | UL transmission on UL-SCH | RRC connection request UE identifier |
| 4$^{th}$ step | Contention Resolution on DL | Temporary C-RNTI on PDCCH for initial access (IA) C-RNTI on PDCCH for UE in RRC_CONNECTED I |

FIG. 15 illustrates an example of a random access procedure.

Firstly, the UE may transmit a PRACH preamble in UL as Msg1 of a random access procedure.

Random access preamble sequences with two different lengths are supported. Long sequence length 839 is applied with subcarrier spacings of 1.25 and 5 kHz, and short sequence length 139 is applied with subcarrier spacings of 15, 30, 60 and 120 kHz. Long sequences support both unrestricted sets and restricted sets of Type A and Type B, while short sequences support unrestricted sets only.

Multiple RACH preamble formats are defined with one or more RACH OFDM symbols, and different cyclic prefix and guard time. The PRACH preamble configuration to use is provided to the UE in the system information.

When there is no response to the Msg1, the UE may retransmit the PRACH preamble with power ramping within the predetermined number of times. The UE calculates the PRACH transmit power for the retransmission of the preamble based on the most recent estimate path loss and power ramping counter. If the UE conducts beam switching, the counter of power ramping remains unchanged.

The system information informs the UE of the association between the SS blocks and the RACH resources.

Figure 16:
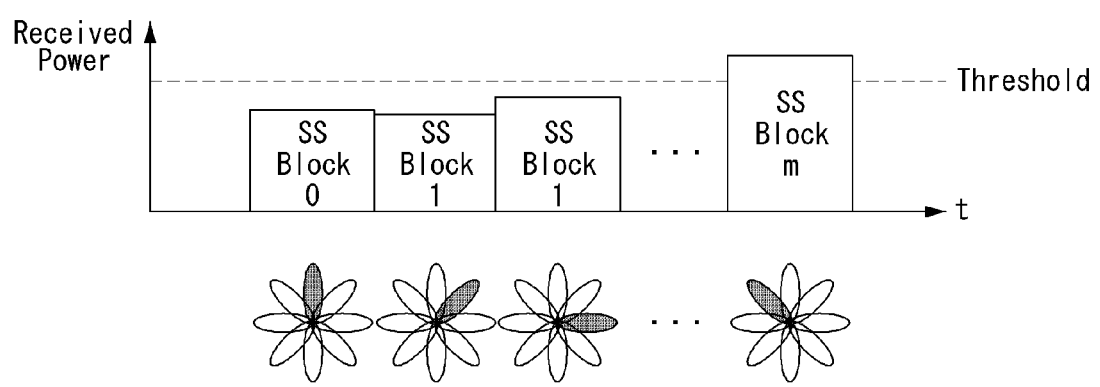
FIG. 16 illustrates the concept of a threshold of an SS block for RACH resource association.

FIG. 16 illustrates the concept of a threshold of an SS block for RACH resource association.

A threshold of the SS block for RACH resource association is based on the RSRP and network configurable. Transmission or retransmission of RACH preamble is based on the SS blocks that satisfy the threshold.

When the UE receives a random access response on DL-SCH, the DL-SCH may provide timing alignment information, RA-preamble ID, initial UL grant and temporary C-RNTI.

Based on this information, the UE may transmit UL transmission on UL-SCH as Msg3 of the random access procedure. Msg3 may include an RRC connection request and a UE identifier.

In response to this, the network may transmit Msg4, which can be treated as a contention resolution message on DL. By receiving this, the UE may enter into an RRC connected state.

Detailed explanation for each of the steps is as follows:

Prior to initiation of the physical random access procedure, Layer 1 shall receive from higher layers a set of SS/PBCH block indexes and shall provide to higher layers a corresponding set of RSRP measurements.

Prior to initiation of the physical random access procedure, Layer 1 shall receive the following information from the higher layers:

- Configuration of physical random access channel (PRACH) transmission parameters (PRACH preamble format, time resources, and frequency resources for PRACH transmission).
- Parameters for determining the root sequences and their cyclic shifts in the PRACH preamble sequence set (index to logical root sequence table, cyclic shift ($N_{CS}$), and set type (unrestricted, restricted set A, or restricted set B)).

From the physical layer perspective, the L1 random access procedure encompasses the transmission of random access preamble (Msg1) in a PRACH, random access response (RAR) message with a PDCCH/PDSCH (Msg2), and when applicable, the transmission of Msg3 PUSCH, and PDSCH for contention resolution.

If a random access procedure is initiated by a "PDCCH order" to the UE, a random access preamble transmission is performed with the same subcarrier spacing as a random access preamble transmission initiated by higher layers.

If a UE is configured with two UL carriers for a serving cell and the UE detects a "PDCCH order", the UE uses an UL/SUL (supplement UL) indicator field value from the detected "PDCCH order" to determine the UL carrier for the corresponding random access preamble transmission.

Regarding the random access preamble transmission step, the physical random access procedure is triggered upon request of a PRACH transmission by higher layers or by a PDCCH order. A configuration by higher layers for a PRACH transmission includes the following:

- a configuration for PRACH transmission.
- a preamble index, a preamble subcarrier spacing, $P_{PRACH,target}$, a corresponding RA-RNTI, and a PRACH resource.

A preamble is transmitted using the selected PRACH format with transmission power $P_{PRACH,b,f,c}(i)$, on the indicated PRACH resource.

A UE is provided with a number of SS/PBCH blocks associated with one PRACH occasion by the value of higher layer parameter SSB-perRACH-Occasion. If the value of SSB-perRACH-Occasion is smaller than 1, one SS/PBCH block is mapped to 1/SSB-per-rach-occasion consecutive PRACH occasions. The UE is provided with a number of preambles per SS/PBCH block by the value of higher layer parameter cb-preamblePerSSB, and the UE determines a total number of preambles per SSB per PRACH occasion as the multiple of the value of SSB-perRACH-Occasion and the value of cb-preamblePerSSB.

SS/PBCH block indexes are mapped to PRACH occasions in the following order.

First, in increasing order of preamble indexes within a single PRACH occasion.

Second, in increasing order of frequency resource indexes for frequency multiplexed PRACH occasions.

Third, in increasing order of time resource indexes for time multiplexed PRACH occasions within a PRACH slot.

Fourth, in increasing order of indexes for PRACH slots.

The period, starting from frame 0, for the mapping of SS/PBCH blocks to PRACH occasions is the smallest of {1, 2, 4} PRACH configuration periods that is larger than or equal to $\lceil N_{Tx}^{SSB}/N_{PRACH\ period}^{SSB} \rceil$, where the UE obtains $N_{Tx}^{SSB}$ from higher layer parameter SSB-transmitted-SIB1, and $N_{PRACH\ period}^{SSB}$ is the number of SS/PBCH blocks that can be mapped to one PRACH configuration period.

If a random access procedure is initiated by a PDCCH order, the UE shall, if requested by higher layers, transmit a PRACH in the first available PRACH occasion for which a time between the last symbol of the PDCCH order reception and the first symbol of the PRACH transmission is larger than or equal to $N_{T,2}+\Delta_{BWPSwitchig}+\Delta_{Delay}$ msec, where $N_{T,2}$ is a time duration of $N_2$ symbols corresponding to a PUSCH preparation time for PUSCH processing capability 1, $\Delta_{BWPSwitchig}$ is pre-defined, and $\Delta_{Delay}>0$.

In response to a PRACH transmission, a UE attempts to detect a PDCCH with a corresponding RA-RNTI during a window controlled by higher layers. The window starts at the first symbol of the earliest control resource set the UE is configured for Type1-PDCCH common search space that is at least $\lceil (\Delta \cdot N_{slot}^{subframe,\mu} \cdot N_{symb}^{slot})/T_{sf} \rceil$ symbols after the last symbol of the preamble sequence transmission. The length of the window in number of slots, based on the subcarrier spacing for Type0-PDCCH common search space is provided by higher layer parameter rar-WindowLength.

If a UE detects the PDCCH with the corresponding RA-RNTI and a corresponding PDSCH that includes a DL-SCH transport block within the window, the UE passes the transport block to higher layers. The higher layers parse the transport block for a random access preamble identity (RAPID) associated with the PRACH transmission. If the higher layers identify the RAPID in RAR message(s) of the DL-SCH transport block, the higher layers indicate an uplink grant to the physical layer. This is referred to as random access response (RAR) UL grant in the physical layer. If the higher layers do not identify the RAPID associated with the PRACH transmission, the higher layers can indicate to the physical layer to transmit a PRACH. A minimum time between the last symbol of the PDSCH reception and the first symbol of the PRACH transmission is equal to $N_{T,1}+\Delta_{new}+0.5$ msec, where $N_{T,1}$ is a time duration of $N_1$ symbols corresponding to a PDSCH reception time for PDSCH processing capability 1 when additional PDSCH DM-RS is configured and $\Delta_{new} \geq 0$.

AUE shall receive the PDCCH with the corresponding RA-RNTI and the corresponding PDSCH that includes the DL-SCH transport block with the same DM-RS antenna port quasi co-location (QCL) properties, as for a detected SS/PBCH block or a received CSI-RS. If the UE attempts to detect the PDCCH with the corresponding RA-RNTI in response to a PRACH transmission initiated by a PDCCH order, the UE assumes that the PDCCH and the PDCCH order have same DM-RS antenna port QCL properties.

A RAR UL grant schedules a PUSCH transmission from the UE (Msg3 PUSCH). The contents of the RAR UL grant, starting with the MSB and ending with the LSB, are given in Table 9. Table 9 shows random access response grant content field size.

TABLE 9

| RAR grant Field | Number of bits |
| --- | --- |
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

The Msg3 PUSCH frequency resource allocation is for uplink resource allocation type 1. In case of frequency hopping, based on the indication of the frequency hopping flag field, the first one or two bits, $N_{UL,hop}$ bits, of the Msg3 PUSCH frequency resource allocation field are used as hopping information bits.

The MCS is determined from the first sixteen indexes of the applicable MCS index table for PUSCH.

The TPC command $\delta_{msg2,b,f,c}$ is used for setting the power of the Msg3 PUSCH, and is interpreted according to Table 10. Table 10 shows TPC command $\gamma_{msg2,b,f,c}$ for Msg3 PUSCH.

TABLE 10

| TPC Command | Value (in dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In a non-contention based random access procedure, a CSI request field is interpreted to determine whether an aperiodic CSI report is included in the corresponding PUSCH transmission. In a contention based random access procedure, the CSI request field is reserved.

Unless a UE is configured with a subcarrier spacing, the UE receives subsequent PDSCH using the same subcarrier spacing as for the PDSCH reception providing the RAR message.

If a UE does not detect the PDCCH with a corresponding RA-RNTI and a corresponding DL-SCH transport block within the window, the UE performs a procedure for random access response reception failure.

For example, the UE may perform power ramping for retransmission of the random access preamble based on a power ramping counter. However, the power ramping counter remains unchanged if a UE conducts beam switching in the PRACH retransmissions as illustrated in FIG. 17.

Figure 17:
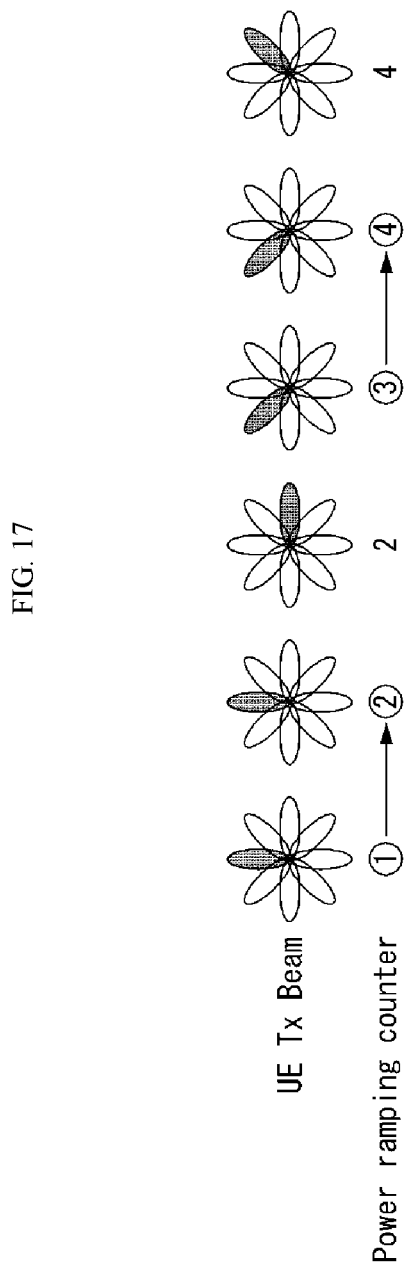
FIG. 17 illustrates a power ramping counter of PRACH.

In FIG. 17, the UE may increase the power ramping counter by 1, when the UE retransmit the random access preamble for the same beam. However, when the beam had been changed, the power ramping counter remains unchanged.

Regarding Msg3 PUSCH transmission, higher layer parameter msg3-tp indicates to a UE whether or not the UE shall apply transform precoding for an Msg3 PUSCH transmission. If the UE applies a transform precoding to Msg3 PUSCH transmission with frequency hopping, a frequency offset for the second hop is given in Table 11. Table 11 shows a frequency offset for second hop for Msg3 PUSCH transmission with frequency hopping.

TABLE 11

| Number of PRBs in initial active UL BWP | Value of $N_{UL,\,hop}$ Hopping bits | Frequency offset for 2nd hop |
| --- | --- | --- |
| $N_{BWP}^{size} < 50$ | 0 | $N_{BWP}^{size}/2$ |
|  | 1 | $N_{BWP}^{size}/4$ |
| $N_{BWP}^{size} \geq 50$ | 00 | $N_{BWP}^{size}/2$ |
|  | 01 | $N_{BWP}^{size}/4$ |
|  | 10 | $-N_{BWP}^{size}/4$ |
|  | 11 | Reserved |

The subcarrier spacing for Msg3 PUSCH transmission is provided by higher layer parameter msg3-scs. A UE shall transmit PRACH and Msg3 PUSCH on a same uplink carrier of the same serving cell. An UL BWP for Msg3 PUSCH transmission is indicated by SystemInformation-Block1.

A minimum time between the last symbol of a PDSCH reception conveying a RAR and the first symbol of a corresponding Msg3 PUSCH transmission scheduled by the RAR in the PDSCH for a UE when the PDSCH and the PUSCH have the same subcarrier spacing is equal to $N_{T,1}+N_{T,2}+N_{TA,max}+0.5$ msec. $N_{T,1}$ is a time duration of $N_1$ symbols corresponding to a PDSCH reception time for PDSCH processing capability 1 when additional PDSCH DM-RS is configured, $N_{T,2}$ is a time duration of $N_2$ symbols corresponding to a PUSCH preparation time for PUSCH processing capability 1, and $N_{TA,max}$ is the maximum timing adjustment value that can be provided by the TA command field in the RAR.

In response to an Msg3 PUSCH transmission when a UE has not been provided with a C-RNTI, the UE attempts to detect a PDCCH with a corresponding TC-RNTI scheduling a PDSCH that includes a UE contention resolution identity. In response to the PDSCH reception with the UE contention resolution identity, the UE transmits HARQ-ACK information in a PUCCH. A minimum time between the last symbol of the PDSCH reception and the first symbol of the corresponding HARQ-ACK transmission is equal to $N_{T,1}+0.5$ msec. $N_{T,1}$ is a time duration of $N_1$ symbols corresponding to a PDSCH reception time for PDSCH processing capability 1 when additional PDSCH DM-RS is configured.

A next-generation wireless communication system uses a wide frequency band and aims to support various services or requirements. For example, in new radio (NR) requirements of the 3GPP, Ultra Reliable and Low Latency Communication (URLLC) that is one of representative scenarios may require low latency and high reliability requirements that a user plane latency of 0.5 ms and X-byte data shall be transmitted at an error rate of 10-5 within 1 ms.

Further, traffic of URLLC is characterized in that it has a file size within tens to hundreds of bytes and occurs sporadically, unlike enhanced Mobile BroadBand (eMBB) with a large traffic capacity.

Thus, the eMBB requires transmission that maximizes a transfer rate and minimize an overhead of control information, whereas the URLLC requires a transmission method with a short scheduling time unit and the reliability.

A reference time unit assumed/used to transmit and receive a physical channel may be variously configured depending on an applied field or a type of traffic. The reference time unit may be a base unit for scheduling a specific physical channel. The reference time unit may vary depending on the number of symbols constituting the corresponding scheduling unit and/or a subcarrier spacing, or the like.

The present disclosure uses a slot and a mini-slot as the reference time unit, for convenience of explanation. For example, the slot used may be a scheduling base unit used in a normal data traffic (e.g., eMBB).

The mini-slot may have a shorter time duration than the slot in a time domain. The mini-slot may be a scheduling base unit used in more special purpose traffic or communication schemes (e.g., URLLC, unlicensed band or millimeter wave, etc.).

However, this is merely an example, and it is apparent that methods described in the present disclosure can be extended and applied even if the eMBB transmits and receives the physical channel based on the mini-slot, and/or even if the URLLC or other communication schemes transmit and receive the physical channel based on the slot.

Hereinafter, the present disclosure proposes methods related to blind decoding.

Specifically, the present disclosure proposes a method of decoding a PDCCH candidate of a high aggregation level or decoding a PDCCH candidate considering a service type (hereinafter, a first embodiment), and a method of reporting a capability of a UE related to a blind decoding operation (hereinafter, a second embodiment).

Hereinafter, embodiments described in the present disclosure have been merely divided for convenience of description, and some methods and/or some configurations of any embodiment can be substituted with methods and/or configurations of other embodiments or can be mutually combined and applied.

In embodiments of the present disclosure, a slot, a subframe, a frame, etc. described below may correspond to detailed examples of given time units used in a wireless communication system. That is, in applying methods described in the present disclosure, a time unit may be substituted and applied with other time units applied to other wireless communication systems.

In embodiments of the present disclosure, a monitoring occasion described below may be referred to as a monitoring span or a monitoring duration.

In embodiments of the present disclosure, the number of CCEs described below may refer to the number of non-overlapping CCEs.

First Embodiment

First, a method of decoding a PDCCH candidate of a high aggregation level or decoding a PDCCH candidate considering a service type is described in detail below.

In a next-generation system, a rule is defined to limit the number of PDCCH candidates that a UE shall attempt to blind decode per slot and the number of channel estimations that the UE shall perform for PDCCH demodulation, for the purposes of the support of various service requirements and/or flexible and efficient resource utilization, or the like.

For more reliable transmission of PDSCH, the reliability of PDCCH scheduling PDSCH also needs to be improved. To this end, a method of supporting PDCCH candidates of a higher aggregation level (AL) (e.g., AL=16) may be considered. There may occur a case where resources are insufficient to transmit PDCCH candidates corresponding to such a high AL in a specific control resource set (CORESET). If a corresponding candidate is split during a specific time duration and transmitted or skipped, scheduling latency and/or restriction may be caused.

Thus, if resources are insufficient to transmit PDCCH candidates corresponding to a specific AL (e.g., AL=16) in a specific CORESET, a rule may be defined, agreed, and/or configured, in which the UE considers as many control channel elements (CCEs) as possible as candidates and performs decoding. This may be that the UE recognizes that some of corresponding PDCCH candidates are punctured or rate-matched, and performs decoding. The above operation may be applied only to the case of a specific AL and/or a specific search space set.

And/or, a rule may be defined, agreed, and/or configured, so that the UE performs an operation of decoding such a partial candidate only when the number of CCEs corresponding to the AL of the PDCCH candidates is equal to or greater than a given portion. This reason is that it may be impossible to decode original information from the PDCCH candidates in which a very small number of CCEs remain. Information on the portion may be defined by a capability of the UE and reported to a base station. That is, it may be construed that the UE can perform decoding only when CCEs that is equal to or greater than a portion reported for PDCCH candidates of the specific AL are secured.

The base station may check whether the corresponding UE performs blind decoding for a partial candidate remaining in a specific portion using this capability information, and may transmit downlink control information (DCI). And/or, information for the portion may be pre-defined and/or may be configured by the base station via higher layer signalling.

And/or, the following operation may be considered to implement such an operation.

If the number of all CCEs of CORESET corresponding to AL=X (highest AL configured to a search space set) does not satisfy X, but satisfies alpha*X (e.g., alpha=0.8), it may be assumed that candidates mapped to all the CCEs corresponding to the entire CORESET are present. If one or more candidates are mapped to AL=X, it may be assumed that only one candidate is monitored, and it may be assumed that hashing for AL=X is not applied (i.e., starting CCE=0), or is applied and wrapped around and mapped. Assuming that the total number of CCEs is Y, the UE may operate considering that CCEs corresponding to X-Y are rate-matched.

And/or, a separate configuration may be added to a search space set configuration. If the corresponding configuration is added, this may mean that the UE additionally monitors a candidate corresponding to hashing=0 by considering that the candidate has been rate-matched with the number of available CCEs within an associated CORESET in a corresponding search space set as described above with respect to an aggregation level (AL) L that is most not smaller than the number of CCEs.

And/or, if a candidate corresponding to X is skipped for the highest AL=X due to a rate matching resource with a corresponding CORESET or a collision with an SSB, the corresponding candidate skip may greatly affect a specific service (e.g., URLLC), and thus it may be assumed that a rate matching operation instead of the candidate skip is performed on AL=X. Characteristically, the UE may apply this to a resource to be rate-matched by a semi-static and/or dynamic indication. For example, upon a rate matching resource indication of PDSCH via layer 1 (L1) signalling, a portion overlapping with the corresponding resource or a scheduled PDSCH region may be rate-matched with a control region (or control). Such an operation may be enabled and/or disabled depending on configuration. Alternatively, rather than limiting to AL=X, configuration, in which the rate matching is used for a specific search space set instead of a candidate skip, may be considered.

And/or, characteristically, such an operation may be performed only on a zero power (ZP)-channel state information (CSI)-reference signal (RS) and a non-zero power (NZP)-CSI-RS among a rate matching resource, PDSCH, and ZP-CSI-RS. Particularly, this may be useful if it is difficult to avoid the transmission of a CSI-RS and the overlap of a synchronization signal set (SS SET) when a monitoring occasion is repeated several times within one slot. The rate-matching may be performed at a resource element (RE) level or empty all CSI-RS transmission symbols. Although a control region (or Control) is rate-matched, a last OFDM symbol of specific DCI and/or PDCCH uses a last symbol of a CORESET associated with a monitored search space set as a basis.

And/or, characteristically, a PDCCH candidate to which such a rate-matching operation will be applied may be enabled and/or disabled only if it is scheduled to specific RNTI that has been pre-defined, agreed and/or configured, belongs to a specific search space set that has been pre-defined, agreed and/or configured, has a specific numerology, has a specific TTI length and/or duration, or is indicated as a specific processing time, and/or if specific CRC masking has been used. This may include a case where the PDCCH candidate has been associated with a specific service type (e.g., URLLC) or a specific reliability and/or latency requirement.

And/or, a flexible symbol window may be configured in a search space set. For example, if a CORESET with a length of 2 (CORESET duration=2) is mapped to the search space set and a monitoring occasion of the corresponding search space set is {0, 4, 8, 10} and is configured within a slot (SS set monitoring in OFDM symbols 0, 4, 8, 10), a corresponding candidate may be skipped when an overlap with PDSCH, a rate matching resource, and CSI-RS occurs for one occasion.

In order to prevent this, if overlaps occurs for the highest AL candidates (or for candidates of a set of ALs), a search space set monitoring occasion may be shifted by the number of OFDM symbols within a flexible symbol window.

For example, when a flexible symbol window is 2 OFDM symbols, this may mean that search space monitoring is shifted if the overlap can be avoided by shifting the search space monitoring within 2 symbols (i.e., OFDM symbol 5 or 6) when an SS set monitoring occasion starting at an OFDM symbol 4 overlaps a rate-matching resource (RMR) or a CSI-RS.

If another rate matching resource occurs although a shift is performed, it may be assumed that a first monitoring occasion is maintained. It may be assumed that such information is determined by only semi-static information so that the base station (or network) and a UE have the same information. If candidates are multiple when a corresponding method is used, a shift operation may be assumed only if all candidates for a specific AL (or AL set) are skipped. In a similar method, it may be assumed that a search space is configured with a shorter period and a monitoring skip is performed on all search spaces that are not monitored because a candidate of a specific AL or AL set is skipped.

If corresponding monitoring is skipped, it may be assumed that BD and/or a channel estimation budget are not allocated to a corresponding occasion. In general, if an AL (or AL set) to be protected for each search space set is configured and all candidates for the corresponding AL are skipped, the entire corresponding search space set may be skipped in a corresponding occasion.

And/or, when a corresponding method is used, a method of calculating the number of CCEs in the CORESET may be as follows.

The number of CCEs may be measured based on the number of RBs and the number of REGs according to CORESET configuration regardless of the rate matching resource or a collision with the SSB. When a corresponding method is used, actually available resources may be less than the number of CCEs if REGs that are not actually used due to the rate matching resource or the collision with the SSB is excluded. The corresponding operation may be an operation different from an operation that the UE performs for other AL (i.e., candidate skip where the candidate overlaps partially or fully with rate matching resource and/or SSB).

And/or, all the CCEs may be calculated except all the rate matching resource, REGs or CCEs that collide against the SSB. If rate matching is performed on a CSI-RS, the corresponding overlap may not be considered.

And/or, if a service type and/or service requirement are determined by a search space, higher priority may be given to a search space set associated with lower latency and/or higher reliability. A rule may be defined, agreed and/or configured to preferentially perform blind decoding for a candidate belonging to a corresponding search space set.

And/or, if a service type and/or service requirements are determined by an RNTI, an RNTI that needs to be monitored for each search space may be pre-defined and/or configured, and higher priority may be given to a search space to which an RNTI associated with lower latency and/or higher reliability belongs. A rule may be defined, agreed and/or configured to preferentially perform blind decoding for a candidate belonging to the corresponding search space set.

Second Embodiment

Next, a method of reporting a UE capability related to a blind decoding operation is described in detail.

In particular, the second embodiment is described by being divided into a method of reporting a UE capability related to blind decoding (hereinafter, method 1), a method of separately defining a UE capability based on a service type (hereinafter, method 2), a method of defining a UE capability as a different value based on a UE capability related to a PDSCH processing time (hereinafter, method 3), a method of defining a UE capability as a different value based on characteristics of a downlink/uplink data channel (hereinafter, method 4), and a method of defining a transmission timing gap as a different value based on a UE capability related to blind decoding (hereinafter, method 5).

The methods described below are merely divided for convenience of description, and configuration of any method can be substituted with configuration of other method or they can be mutually combined and applied.

(Method 1)

First, a method of reporting a UE capability related to blind decoding is described in detail.

If traffic that needs to satisfy a URLLC service or lower latency requirement has to be processed, more frequent scheduling may need to be performed using a channel with a shorter duration. In this case, a monitoring occasion within a slot may need to be split in pieces. In such a situation, a blind decoding (BD) limit of a UE that has been currently defined may be insufficient, and a capability capable of performing a larger number of blind decodings in order to support the services and/or requirements may be defined, agreed and/or configured as a UE capability. In the present disclosure, a monitoring occasion may be referred to as a monitoring span or monitoring duration.

Characteristically, a rule may be defined, agreed and/or configured, so that a UE reports a maximum number of PDCCH candidates capable of being monitored within one monitoring occasion. Such a capability may be separately defined and reported per the number (and/or group) of monitoring occasions within a slot if a set of the number of monitoring occasions within a slot is fixed. In general, information about a maximum number of PDCCH candidates capable of being monitored for a given time duration, a maximum number of corresponding time durations within a slot, and/or a minimum gap between time durations may be reported as the UE capability.

And/or, information about a maximum number of monitoring occasions within a slot, a minimum gap between monitoring occasions, and/or a maximum number of PDCCH candidates that the UE can monitor within one monitoring occasion per numerology may be reported as a UE capability.

And/or, information about a maximum number of CCEs which is capable of channel estimation (CE) for a given time duration (e.g., monitoring occasion), a maximum number of corresponding time durations within a slot, and/or a minimum gap between time durations may be reported as a UE capability. In the present disclosure, the number of CCEs may mean the number of non-overlapping CCEs.

And/or, information about a maximum number of CCEs that the UE can channel-estimate per each maximum number of monitoring occasions within a slot, each length of a monitoring occasion, each gap (e.g., minimum gap) between monitoring occasions, and/or each numerology may be reported as a UE capability. In other words, information on a maximum number of non-overlapped CCEs which can be channel-estimated per monitoring occasion may be reported as a UE capability per at least one of the length of the monitoring occasion, a gap between monitoring occasions, and/or numerology.

And/or, a maximum number of BDs and/or CEs supportable in one monitoring occasion is the same as the number that has been currently defined in eMBB (e.g., the number at 15 kHz is 44/56), and based on this, a rule may be defined, agreed and/or configured so that a maximum number of BDs and/or CEs which can be supported by the UE within a specific time duration (e.g., 1 ms) is determined (e.g., 8 times the corresponding number).

As a characteristic example, if a maximum number of monitoring occasions within a slot is 7 (when a minimum gap is 2 symbols), a BD limit may be 20 and a CE limit may be 40 (BD limit=20 and CE limit=40), whereas if a maximum number of monitoring occasions within a slot is 2 (when a minimum gap is 7 symbols), a BD limit may be 44 and a CE limit may be 56 (BD limit=44 and CE limit=56). That is, a rule may be defined and/or configured, so that the BD limit and/or the CE limit tend to decrease as a minimum gap between monitoring occasions decreases.

A base station may configure a monitoring occasion using the above information, so that the monitoring occasion does not exceed a capability of the corresponding UE. A rule may be defined, agreed and/or configured, so that the UE skips monitoring for a monitoring occasion, a candidate and/or an AL (and/or set) with low priority based on a pre-defined priority (or so that the UE does not expect a configuration exceeding its own capability) when the monitoring occasion exceeds the capability of the corresponding UE.

(Method 2)

Next, a method of separately defining a UE capability related to blind decoding based on a service type is described.

When a capability is defined as described above (e.g., when information about a maximum number of PDCCH candidates capable of being monitored for a given time duration, a maximum number of non-overlapped CCEs, a maximum number of corresponding time durations within a slot, a minimum gap between time durations, and/or a length of the time duration is defined as a UE capability), the corresponding capability may be separately defined, agreed and/or configured per target service (e.g., URLLC), quality of service (QoS), BLER requirements, reliability requirements, latency requirements, and/or processing time.

And/or, the corresponding capability may be separately defined, agreed and/or configured per search space (type), RNTI, CORESET, DCI format (group), DCI size, and/or aggregation level (AL). For example, for search spaces (and/or types) which may be classified into a plurality of groups, the PDCCH monitoring capability may be separately defined, agreed and/or configured for each group.

And/or, if a maximum number of PDCCH candidates capable of being monitored per slot and/or a maximum number of non-overlapped CCEs are defined as X and the number of time durations within a slot is {Y1, Y2, . . . , Yn}, X may be defined, agreed and/or configured as a minimum common multiple of {Y1, Y2, . . . , Yn}. Furthermore, if the number of time durations within a slot is Yk, X/Yk may be defined, agreed and/or configured as a maximum number of PDCCH candidates capable of being monitored in the corresponding time duration and/or a maximum number of non-overlapped control channel elements (CCEs).

In general, if a maximum number of PDCCH candidates capable of being monitored per slot and/or a maximum number of non-overlapped CCEs are defined as X and the number of time durations within a slot is {Y1, Y2, . . . , Yn}, a maximum number of PDCCH candidates capable of being monitored in the corresponding time duration and/or a maximum number of non-overlapped CCEs for the number Yk of specific time durations within a slot may be defined, agreed and/or configured as the greatest integer (i.e., floor{X/Yk}) smaller than X/Yk.

A base station may configure a monitoring occasion, the number of candidates, CORESET, and/or a search space using the above information, so that they do not exceed a capability of the corresponding UE. A rule may be defined, agreed and/or configured, so that the UE skips monitoring for a monitoring occasion, a candidate, an AL, and/or a search space (and/or set) with low priority based on a pre-defined priority (or so that the UE does not expect a configuration exceeding its own capability) when they exceed the capability of the corresponding UE.

(Method 3)

Next, a method of defining a UE capability related to blind decoding as a different value based on a UE capability related to a PDSCH processing time is described.

And/or, after PDCCH decoding is terminated, based on this, a UE performs a necessary operation among PDSCH decoding, HARQ-ACK encoding, and PUSCH encoding. In this case, if a maximum number of PDCCH candidates to be monitored by the UE within a specific time and/or a maximum number of non-overlapped CCEs increase, a time margin necessary for operations that need to be subsequently performed may be reduced due to PDCCH monitoring.

Thus, if a capability is defined as described above (e.g., information for a maximum number of PDCCH candidates which can be monitored for a given time duration, a maximum number of non-overlapped control channel elements (CCEs), a maximum number of corresponding time durations within a slot, a minimum gap between time durations, and/or a length of the time duration is defined as a UE capability), the corresponding capability may be defined, agreed and/or configured (independently) as a different value based on a UE capability (e.g., UE PDSCH processing procedure time and/or UE PUSCH preparation procedure time) for a scheduling timing gap (PDCCH-to-PDSCH timing gap, PDCCH-to-PUSCH timing gap, and/or a PDSCH-to-PUCCH timing gap) and/or a configuration of a base station for the scheduling timing gap. The PDCCH-to-PDSCH timing gap may mean a timing gap (e.g., k0) from a reception time of PDCCH to a reception time of a PDSCH scheduled by the corresponding PDCCH. For example, the PDSCH-to-PUCCH timing gap may mean a timing gap (e.g., k1) from a reception time of PDSCH to a transmission time of PUCCH including HARQ-ACK information for the corresponding PDSCH.

For example, if values of the UE capability for the PDSCH-to-PUCCH timing gap are defined as 8 symbols and 3 symbols, respectively, values of the UE capability for a maximum number of PDCCH candidates capable of being monitored within a slot for a specific time duration and/or a maximum number of non-overlapped CCEs may be defined, agreed and/or configured as X and Y (e.g., X>Y), respectively.

And/or, the UE capability (e.g., UE PDSCH processing procedure time and/or UE PUSCH preparation procedure time) for the PDCCH-to-PUSCH timing gap and/or the PDSCH-to-PUCCH timing gap and/or configuration (e.g., minimum value of scheduling timing gap) of a base station for the scheduling timing gap may be defined, agreed and/or configured (independently) as a different value based on the PDCCH monitoring capability (e.g., a maximum number of PDCCH candidates capable of being monitored within a slot for a specific time duration and/or a maximum number of non-overlapped CCEs).

For example, if the PDCCH candidates need to be monitored 44 times in one slot, and if the PDCCH candidates need to be monitored 44 times in one half slot (i.e., time duration corresponding to half of a slot), values of the UE capability for the PDSCH-to-PUCCH timing gap may be defined, agreed and/or configured as X symbols and Y symbols (e.g., X<Y or Y=X+alpha and alpha>0), respectively.

For another example, if the PDCCH candidates need to be monitored 44 times in one slot, and if the PDCCH candidates need to be monitored 44 times per monitoring occasion when a minimum gap between two consecutive PDCCH transmissions within a slot is 2 symbols, values of the UE capability for the PDSCH-to-PUCCH timing gap may be defined, agreed and/or configured as X symbols and Y symbols (e.g., X<Y or Y=X+alpha and alpha>0), respectively.

And/or, if the UE capability (e.g., UE PDSCH processing procedure time and/or UE PUSCH preparation procedure time) for the PDCCH-to-PUSCH timing gap and/or the PDSCH-to-PUCCH timing gap is equal to or less than a specific value, the PDCCH monitoring capability (e.g., a maximum number of PDCCH candidates capable of being monitored within a slot for a specific time duration and/or a maximum number of non-overlapped CCEs) may not be applied, and a maximum number of PDCCH candidates capable of being monitored during the existing slot and/or a maximum number of non-overlapped CCEs may be applied.

And/or, if the PDCCH monitoring capability (e.g., a maximum number of PDCCH candidates capable of being monitored within a slot for a specific time duration, a maximum number of non-overlapped CCEs, a maximum number of corresponding time durations within a slot, a minimum gap between time durations, and/or a length of a time duration) is equal to or greater than a predetermined level, the UE capability (e.g., UE PDSCH processing procedure time and/or UE PUSCH preparation procedure time) for the PDCCH-to-PUSCH timing gap and/or the PDSCH-to-PUCCH timing gap may be applied as a processing capability 1.

The base station may configure a monitoring occasion, the number of candidates, CORESET, and/or a search space using the above information, so that they do not exceed a capability of the corresponding UE. A rule may be defined, agreed and/or configured, so that the UE skips monitoring for a monitoring occasion, a candidate, an AL, and/or a search space (set) with low priority based on a pre-defined priority (or so that the UE does not expect a configuration exceeding its own capability) when they exceed the capability of the corresponding UE.

(Method 4)

Next, a method of defining a UE capability related to blind decoding as a different value based on characteristics of a downlink/uplink data channel is described.

If a capability is defined as described above (e.g., information about a maximum number of PDCCH candidates capable of being monitored for a given time duration, a maximum number of non-overlapped CCEs, a maximum number of corresponding time durations within a slot, a minimum gap between time durations, and/or a length of the time duration is defined as a UE capability), the corresponding capability may be separately defined, agreed and/or configured (independently) as a different value based on a transport block size, the number of layers, and/or the number of RBs of downlink and/or uplink data channel (DL/UL data channel).

And/or, upper and lower limits of the transport block size, the number of layers, and the number of RBs of the downlink and/or uplink data channel may be defined, agreed and/or configured (independently) as a different value based on the PDCCH monitoring capability (e.g., a maximum number of PDCCH candidates capable of being monitored within a slot for a specific time duration, a maximum number of non-overlapped CCEs, a maximum number of corresponding time durations within a slot, a minimum gap between time durations, and/or a length of a time duration).

And/or, if the transport block size, the number of layers, and the number of RBs of the downlink and/or uplink data channel are equal to or greater than a specific value, the PDCCH monitoring capability (e.g., a maximum number of PDCCH candidates capable of being monitored within a slot for a specific time duration, a maximum number of non-overlapped CCEs, a maximum number of corresponding time durations within a slot, a minimum gap between time durations, and/or a length of a time duration) may not be applied, and a maximum number of PDCCH candidates which can be monitored during the existing slot and/or a maximum number of non-overlapped CCEs may be applied.

A base station may configure a monitoring occasion, the number of candidates, CORESET, and/or a search space using the above information, so that they do not exceed a capability of the corresponding UE. A rule may be defined, agreed and/or configured, so that the UE skips monitoring for a monitoring occasion, a candidate, an AL, and/or a search space (set) with low priority based on a pre-defined priority (or so that the UE does not expect a configuration exceeding its own capability) when they exceed the capability of the corresponding UE.

And/or, characteristically, a restriction on the transport block size, the number of layers, and/or the number of RBs of the downlink and/or uplink data channel may be defined and/or applied to only a specific monitoring occasion, span and/or time duration.

And/or, a restriction on the transport block size, the number of layers, and/or the number of RBs of the downlink and/or uplink data channel may be independently (differently) defined and/or applied per monitoring occasion, span and/or time duration.

This may be to prevent an excessive increase in processing complexity of the UE by also defining a scheduling restriction in a monitoring occasion, span and/or time duration, in which a maximum number of PDCCH candidates and/or a maximum number of non-overlapped CCEs having greater values are defined, considering that a maximum number of PDCCH candidates and/or a maximum number of non-overlapped CCEs having different values can be defined per monitoring occasion, span and/or time duration within a slot.

For example, a maximum number of PDCCH candidates and/or a maximum number of non-overlapped CCEs in a first monitoring occasion and/or span within a slot may be defined to have a greater value than that in remaining monitoring occasions and/or spans. A restriction on the upper limit of the transport block size, the number of layers, and/or the number of RBs of the downlink and/or uplink data channel may be defined for only the first monitoring occasion and/or span. In this case, the UE may expect that a downlink and/or uplink data channel corresponding to a transport block size, the number of layers, and/or the number of RBs not exceeding the restriction is scheduled in the first monitoring occasion and/or span.

For another example, the upper limit of the transport block size, the number of layers, and/or the number of RBs of the downlink and/or uplink data channel having different values may be defined between the first monitoring occasion and/or span and the remaining monitoring occasions and/or spans. In this case, the UE may expect that a downlink and/or uplink data channel is scheduled in each monitoring occasion and/or span not to exceed the upper limit of the transport block size, the number of layers, and/or the number of RBs that are defined, respectively.

(Method 5)

Next, a method of defining a transmission timing gap as a different value based on a UE capability related to blind decoding is described.

A value (e.g., minimum value of a scheduling timing gap) of a PDCCH-to-PDSCH timing gap which may be configured and/or indicated by a base station may be defined (independently) as a different value (and/or may be reported to the base station as a UE capability) based on the PDCCH monitoring capability (e.g., a maximum number of PDCCH candidates and/or a maximum number of non-overlapped CCEs which can be monitored for a specific time duration within a slot).

For example, a rule may be defined, agreed and/or configured, such that a first symbol of a PDSCH is scheduled so that it is not ahead of a last symbol of the PDCCH when the PDCCH candidates need to be monitored 44 times in one slot, and so that the PDSCH can start from after a predetermined time has passed from the last symbol of the PDCCH when the PDCCH candidates need to be monitored 44 times in one half slot (i.e., time duration corresponding to half of a slot). Even in this case, after PDCCH decoding is terminated, based on this, a UE sequentially performs a necessary operation among PDSCH decoding, HARQ-ACK encoding, and PUSCH encoding. This may consider that a time margin necessary for operations that need to be subsequently performed may be reduced due to PDCCH monitoring if a maximum number of PDCCH candidates and/or a maximum number of non-overlapped CCEs, that the UE shall monitor within a specific time, increase.

A base station may configure a monitoring occasion, the number of candidates, CORESET, and/or a search space based on the rule and/or information obtained from the UE so that they do not exceed a capability of the corresponding UE, and may determine a PDCCH-to-PDSCH timing gap to a limit that can be processed by the UE. A rule may be defined, agreed and/or configured, so that the UE skips monitoring for a monitoring occasion, a candidate, an AL, and/or a search space (set) with low priority based on a pre-defined priority (or so that the UE does not expect a configuration exceeding its own capability) when they exceed the capability of the corresponding UE.

In the present disclosure, a target service (e.g., URLLC), QoS, BLER requirement, reliability requirement, latency requirement and/or a processing time for a specific channel may be configured via high layer signal, may be explicitly indicated via a specific field of DCI, may be distinguished through a search space to which a PDCCH (scheduling downlink and/or uplink data (DL/UL data)) belongs, may be distinguished through a control resource set (CORESET) to which a PDCCH (scheduling downlink and/or uplink data) belongs, may be distinguished by RNTI, may be distinguished by a DCI format, and/or may be distinguished through the CRC masking of the PDCCH.

The proposals of the present disclosure can also be applied to the handling of a plurality of types of channels distinguished by a specific field of DCI, a search space to which PDCCH belongs, CORESET to which PDCCH belongs, RNTI, a DCI format and/or the CRC masking of PDCCH, etc. without explicit distinction for a target service, QoS, BLER requirement, reliability requirement, latency requirement and/or a processing time for a channel. In the proposals of the present disclosure, "a channel corresponding to a specific target service, QoS, BLER requirement, reliability requirement, latency requirement and/or processing time" may be substituted and applied as "a specific channel distinguished by a specific field of DCI, a search space to which PDCCH belongs, CORESET to which PDCCH belongs, RNTI, a DCI format and/or CRC masking of PDCCH among a plurality of types of channels".

It is evident that examples of the above-described proposed methods can also be considered as a kind of proposed methods since they can be included in implementation methods of the present disclosure. Furthermore, the above-described proposed methods may be independently implemented, and may be implemented in the form of a combination (or merge) of some of the proposed methods. A rule may be defined, agreed and/or configured so that the base station informs the UE of information about whether to apply the proposed methods (or information about the rules of the proposed methods) via a pre-defined signal (e.g., physical layer signal or higher layer signal).

Figure 18:
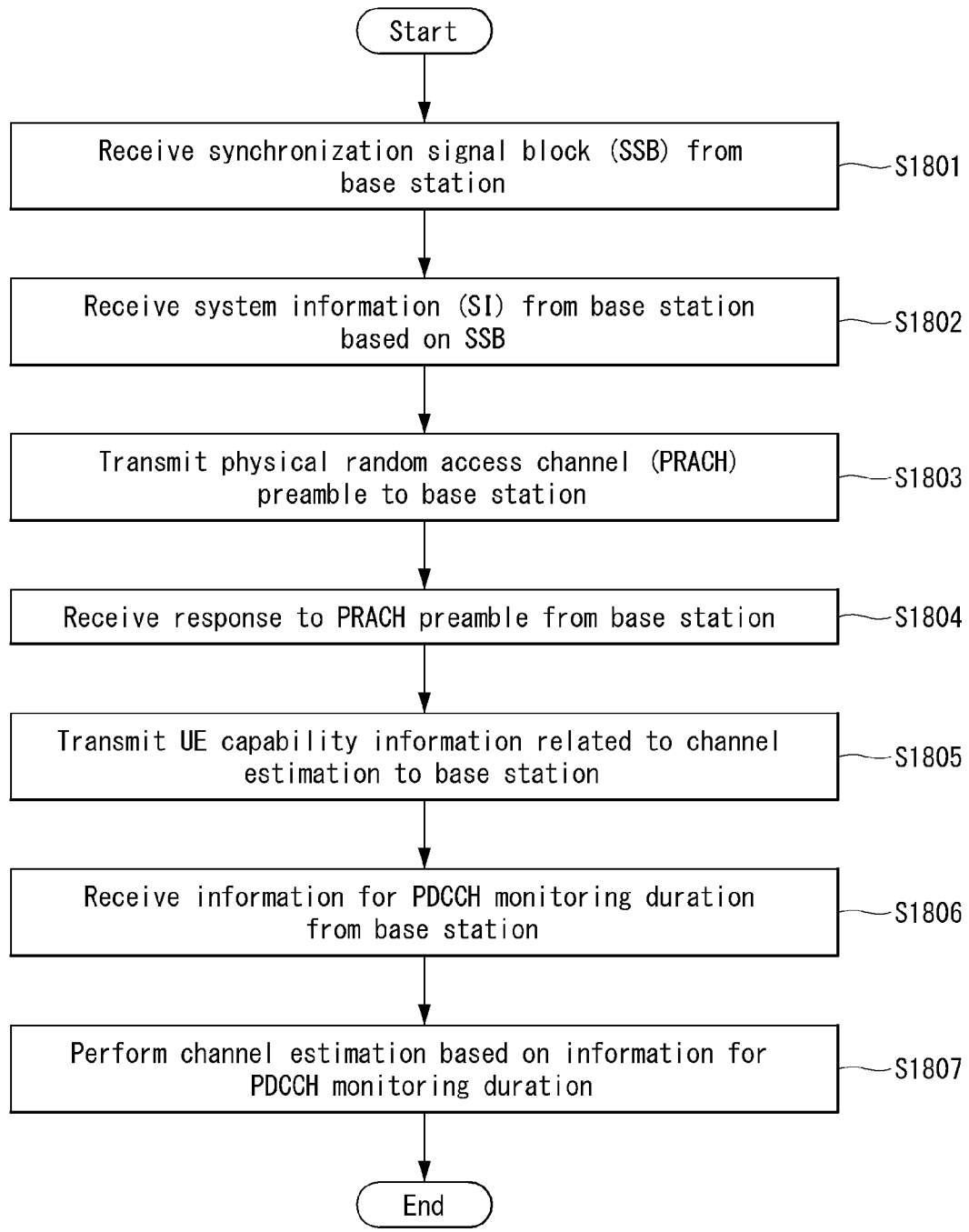
FIG. 18 is a flow chart illustrating an operation method of a UE described in the present disclosure.

FIG. 18 is a flow chart illustrating an operation method of a UE described in the present disclosure.

Referring to FIG. 18, first, a UE may receive a synchronization signal block (SSB) from a base station in S1801. The SSB may include a primary synchronization signal (PSS), a secondary synchronization signal (SSS), and a physical broadcast channel (PBCH). The UE may synchronize with the base station based on the PSS and the SSS and acquire information such as a cell ID. The UE may receive the PBCH and receive in-cell broadcast information (e.g., MIB).

Next, the UE may receive system information (SI) from the base station based on the SSB in S1802. The system information may mean a system information block (SIB). After acquiring the synchronization, the UE may receive the system information based on the PBCH. The PBCH may include information (e.g., pdcch-ConfigSIB1) such as a frequency location of the system information.

Next, the UE may transmit a physical random access channel (PRACH) preamble to the base station in S1803. When there is no resource for initial access or signal transmission, the UE may transmit the PRACH preamble to the base station. And/or, the UE may receive a PDCCH order from the base station and transmit the PRACH preamble to the base station.

Next, the UE may receive a response to the PRACH preamble from the base station in S1804. In case of contention based RACH, the UE may additionally perform a contention resolution procedure. Hence, the UE may acquire uplink synchronization.

Next, the UE may transmit, to the base station, UE capability information related to a channel estimation in S1805.

The UE capability information may include information for a maximum number of control channel elements (CCEs) that are capable of channel estimation per PDCCH monitoring duration. In the present disclosure, the PDCCH monitoring duration may be referred to as a PDCCH monitoring span or a PDCCH monitoring occasion.

One CCE may include a plurality of resource element groups (REGs). The REG may be comprised of one symbol and 12 resource elements.

Next, the UE may receive information for the PDCCH monitoring duration from the base station in S1806.

The information for the PDCCH monitoring duration may include information for a search space set and/or information for a control resource set (CORESET). The UE may determine the PDCCH monitoring duration based on information for the search space set and/or information for the control resource set.

The base station may receive the UE capability information from the UE and may transmit and/or configure the information for the PDCCH monitoring duration so that it does not exceed a UE's capability based on the UE capability information.

Next, the UE may perform a channel estimation based on the information for the PDCCH monitoring duration in S1807. The UE may perform the channel estimation based on the CCE in the monitoring duration.

Upon the channel estimation, when the number of CCEs in the PDCCH monitoring duration exceeds the UE's capability, the UE may, based on a pre-defined and/or pre-configured priority, preferentially channel-estimate a PDCCH monitoring duration and/or a CCE with a higher priority and skip a PDCCH monitoring duration and/or a CCE with a lower priority.

In this instance, when the number of CCEs in the PDCCH monitoring duration exceeds a maximum number of CCEs that the UE can support, the base station may expect to preferentially channel-estimate a PDCCH monitoring duration and/or a CCE with a higher priority and skip a PDCCH monitoring duration and/or a CCE with a lower priority.

Information for the maximum number of CCEs may be determined based on at least one of a length of the PDCCH monitoring duration, an interval between the PDCCH monitoring durations, and/or numerology. For example, the information for the maximum number of CCEs may include a maximum number of CCEs that the UE can channel-estimate in one PDCCH monitoring duration per at least one of a length of the PDCCH monitoring duration, an interval between the PDCCH monitoring durations, and/or numerology.

The maximum number of CCEs may be the number of non-overlapped CCEs.

And/or, the information for the maximum number of CCEs may be determined based on at least one of a service type, quality of service (QoS), service requirement, and/or processing time. For example, the information for the maximum number of CCEs may include a maximum number of CCEs that the UE can channel-estimate in one PDCCH monitoring duration per at least one of a service type, quality of service (QoS), service requirement, and/or processing time. For example, the service type may mean whether or not the service type is for transmitting and receiving eMBB data and URLLC data. The service requirement may mean BLER requirement, reliability requirement, and/or latency requirement, and the like. The processing time may mean a physical downlink shared channel (PDSCH) processing time, a channel state information (CSI) computation time, and/or a physical uplink shared channel (PUSCH) preparation time, and the like.

And/or, the information for the maximum number of CCEs may be determined based on at least one of a PDSCH processing time and/or a PUSCH preparation time of the UE. For example, the information for the maximum number of CCEs may include a maximum number of CCEs that the UE can channel-estimate in one PDCCH monitoring duration per at least one of a PDSCH processing time and/or a PUSCH preparation time.

And/or, the information for the maximum number of CCEs may be determined based on at least one of a transport block size, the number of layers, and/or the number of RBs of at least one of PDSCH and/or PUSCH. For example, the information for the maximum number of CCEs may include a maximum number of CCEs that the UE can channel-estimate in one PDCCH monitoring duration per transport block size of the PDSCH.

And/or, a timing interval (e.g., K0) between PDCCH and PDSCH may be configured by the base station based on information for the maximum number of CCEs. For example, a timing interval between PDCCH and PDSCH configured as the maximum number of CCEs increases may increase. And/or, a timing interval (e.g., K2) between PDCCH and PUSCH may be configured by the base station based on information for the maximum number of CCEs. And/or, a timing interval (e.g., K0) between PDCCH and HARQ-ACK information transmission may be configured by the base station based on information for the maximum number of CCEs.

Since the operation method of the UE described with reference to FIG. 18 is the same as the operation method of the UE described with reference to FIGS. 1 to 17, a further description thereof is omitted.

Figure 20:
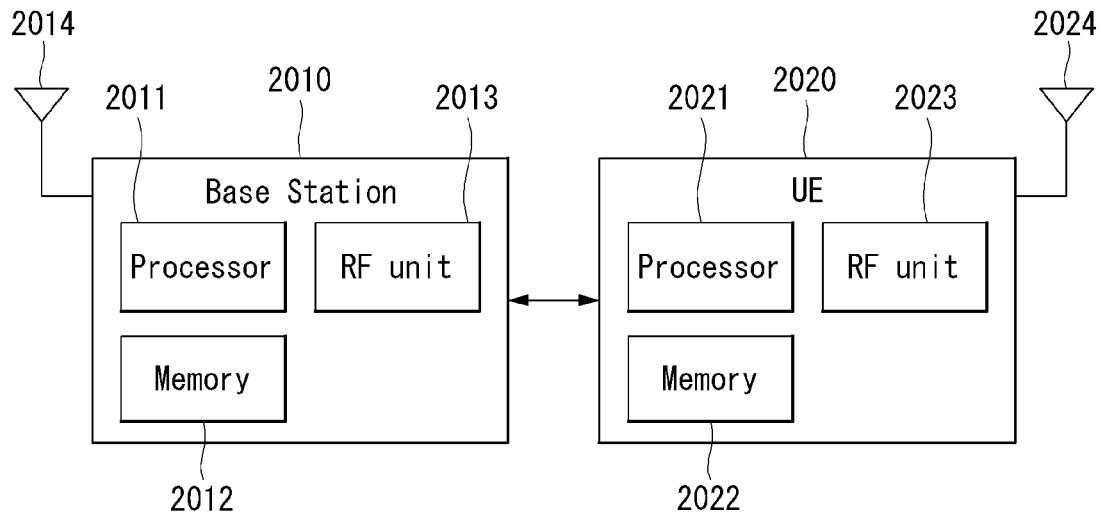
FIG. 20 illustrates a block configuration diagram of a wireless communication device to which methods described in the present disclosure are applicable.

With regard to this, the above-described operation of the UE can be implemented in detail by a UE 2020 illustrated in FIG. 20. For example, the above-described operation of the UE can be performed by a processor 2021 and/or an RF unit 2023.

Referring to FIG. 20, first, the processor 2021 may receive a synchronization signal block (SSB) from a base station through the RF unit 2023 in S1801. The SSB may include a primary synchronization signal (PSS), a secondary synchronization signal (SSS), and a physical broadcast channel (PBCH). The UE may synchronize with the base station based on the PSS and the SSS and acquire information such as a cell ID. The UE may receive the PBCH and receive in-cell broadcast information (e.g., MIB).

Next, the processor 2021 may receive system information (SI) from the base station based on the SSB through the RF unit 2023 in S1802. The system information may mean a system information block (SIB). After acquiring the synchronization, the UE may receive the system information based on the PBCH. The PBCH may include information (e.g., pdcch-ConfigSIB1) such as a frequency location of the system information.

Next, the processor 2021 may transmit a physical random access channel (PRACH) preamble to the base station through the RF unit 2023 in S1803. When there is no resource for initial access or signal transmission, the UE may transmit the PRACH preamble to the base station. And/or, the UE may receive a PDCCH order from the base station and transmit the PRACH preamble to the base station.

Next, the processor 2021 may receive a response to the PRACH preamble from the base station through the RF unit 2023 in S1804. In case of contention based RACH, the UE may additionally perform a contention resolution procedure. Hence, the UE may acquire uplink synchronization.

Next, the processor 2021 may transmit, to the base station, UE capability information related to a channel estimation through the RF unit 2023 in S1805.

The UE capability information may include information for a maximum number of control channel elements (CCEs) that are capable of channel estimation per PDCCH monitoring duration. In the present disclosure, the PDCCH monitoring duration may be referred to as a PDCCH monitoring span or a PDCCH monitoring occasion.

One CCE may include a plurality of resource element groups (REGs). The REG may be comprised of one symbol and 12 resource elements.

Next, the processor 2021 may receive information for the PDCCH monitoring duration from the base station through the RF unit 2023 in S1806.

The information for the PDCCH monitoring duration may include information for a search space set and/or information for a control resource set (CORESET). The UE may determine the PDCCH monitoring duration based on information for the search space set and/or information for the control resource set.

The base station may receive the UE capability information from the UE and may transmit and/or configure the information for the PDCCH monitoring duration so that it does not exceed a UE's capability based on the UE capability information.

Next, the processor 2021 may perform a channel estimation based on the information for the PDCCH monitoring duration through the RF unit 2023 in S1807. The UE may perform the channel estimation based on the CCE in the monitoring duration.

Upon the channel estimation, when the number of CCEs in the PDCCH monitoring duration exceeds the UE's capability, the UE may, based on a pre-defined and/or pre-configured priority, preferentially channel-estimate a PDCCH monitoring duration and/or a CCE with a higher priority and skip a PDCCH monitoring duration and/or a CCE with a lower priority.

In this instance, when the number of CCEs in the PDCCH monitoring duration exceeds a maximum number of CCEs that the UE can support, the base station may expect to preferentially channel-estimate a PDCCH monitoring duration and/or a CCE with a higher priority and skip a PDCCH monitoring duration and/or a CCE with a lower priority.

Information for the maximum number of CCEs may be determined based on at least one of a length of the PDCCH monitoring duration, an interval between the PDCCH monitoring durations, and/or numerology. For example, the information for the maximum number of CCEs may include a maximum number of CCEs that the UE can channel-estimate in one PDCCH monitoring duration per at least one of a length of the PDCCH monitoring duration, an interval between the PDCCH monitoring durations, and/or numerology.

The maximum number of CCEs may be the number of non-overlapped CCEs.

And/or, the information for the maximum number of CCEs may be determined based on at least one of a service type, quality of service (QoS), service requirement, and/or processing time. For example, the information for the maximum number of CCEs may include a maximum number of CCEs that the UE can channel-estimate in one PDCCH monitoring duration per at least one of a service type, quality of service (QoS), service requirement, and/or processing time. For example, the service type may mean whether or not the service type is for transmitting and receiving eMBB data and URLLC data. The service requirement may mean BLER requirement, reliability requirement, and/or latency requirement, and the like. The processing time may mean a physical downlink shared channel (PDSCH) processing time, a channel state information (CSI) computation time, and/or a physical uplink shared channel (PUSCH) preparation time, and the like.

And/or, the information for the maximum number of CCEs may be determined based on at least one of a PDSCH processing time and/or a PUSCH preparation time of the UE. For example, the information for the maximum number of CCEs may include a maximum number of CCEs that the UE can channel-estimate in one PDCCH monitoring duration per at least one of a PDSCH processing time and/or a PUSCH preparation time.

And/or, the information for the maximum number of CCEs may be determined based on at least one of a transport block size, the number of layers, and/or the number of RBs of at least one of PDSCH and/or PUSCH. For example, the information for the maximum number of CCEs may include a maximum number of CCEs that the UE can channel-estimate in one PDCCH monitoring duration per transport block size of the PDSCH.

And/or, a timing interval (e.g., K0) between PDCCH and PDSCH may be configured by the base station based on information for the maximum number of CCEs. For example, a timing interval between PDCCH and PDSCH configured as the maximum number of CCEs increases may increase. And/or, a timing interval (e.g., K2) between PDCCH and PUSCH may be configured by the base station based on information for the maximum number of CCEs. And/or, a timing interval (e.g., K0) between PDCCH and HARQ-ACK information transmission may be configured by the base station based on information for the maximum number of CCEs.

Since the operation of the UE described with reference to FIG. 20 is the same as the operation of the UE described with reference to FIGS. 1 to 18, a further description thereof is omitted.

Figure 19:
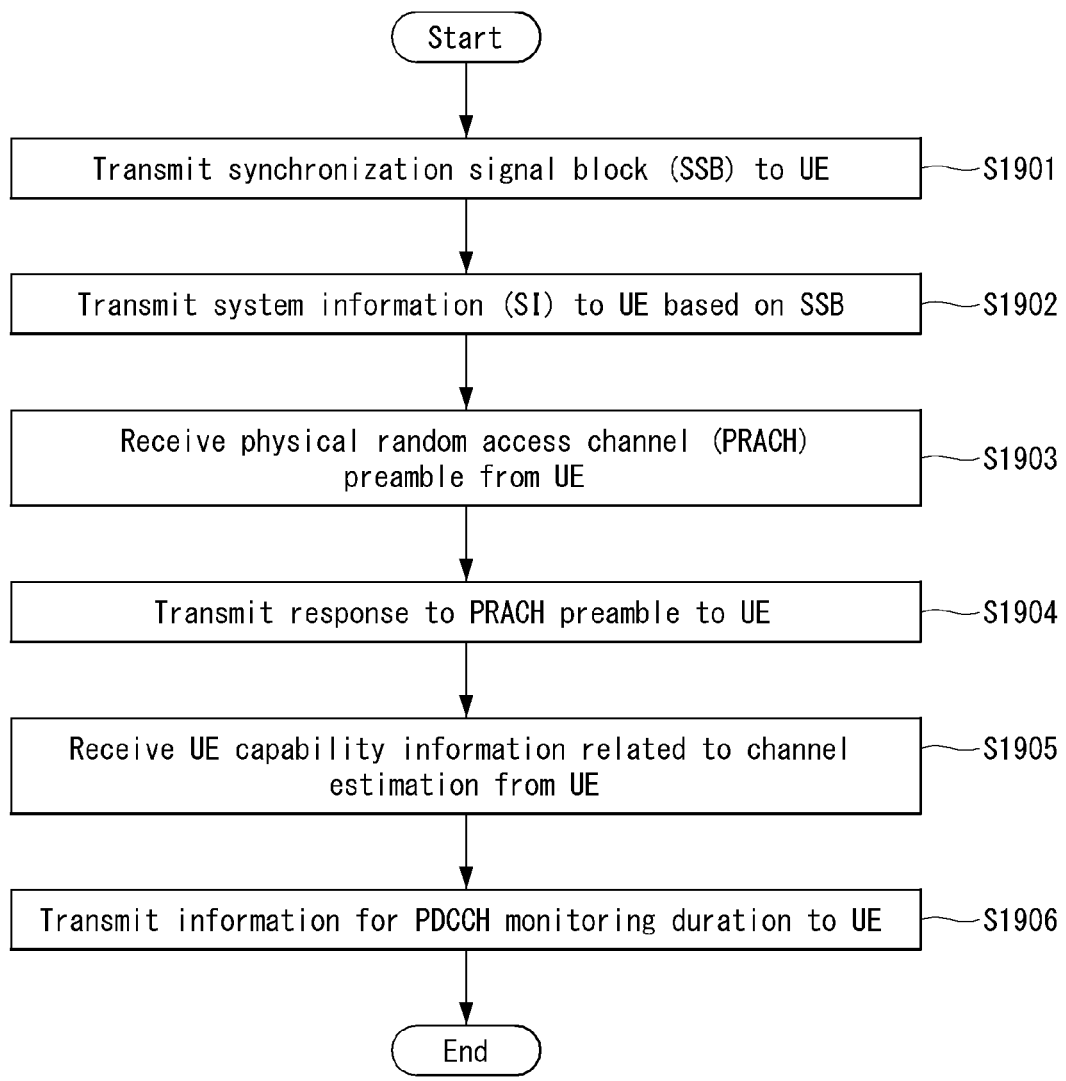
FIG. 19 is a flow chart illustrating an operation method of a base station described in the present disclosure.

FIG. 19 is a flow chart illustrating an operation method of a base station described in the present disclosure.

Referring to FIG. 19, first, a base station may transmit a synchronization signal block (SSB) to a UE in S1901. The SSB may include a primary synchronization signal (PSS), a secondary synchronization signal (SSS), and a physical broadcast channel (PBCH). The UE may synchronize with the base station based on the PSS and the SSS and acquire information such as a cell ID. The UE may receive the PBCH and receive in-cell broadcast information (e.g., MIB).

Next, the base station may transmit system information (SI) to the UE based on the SSB in S1902. The system information may mean a system information block (SIB). After acquiring the synchronization, the UE may receive the system information based on the PBCH. The PBCH may include information (e.g., pdcch-ConfigSIB1) such as a frequency location of the system information.

Next, the base station may receive a physical random access channel (PRACH) preamble from the UE in S1903. When there is no resource for initial access or signal transmission, the UE may transmit the PRACH preamble to the base station. And/or, the UE may receive a PDCCH order from the base station and transmit the PRACH preamble to the base station.

Next, the base station may transmit a response to the PRACH preamble to the UE in S1904. In case of contention based RACH, the UE may additionally perform a contention resolution procedure. Hence, the UE may acquire uplink synchronization.

Next, the base station may receive, from the UE, UE capability information related to a channel estimation in S1905.

The UE capability information may include information for a maximum number of control channel elements (CCEs) that are capable of channel estimation per PDCCH monitoring duration. In the present disclosure, the PDCCH monitoring duration may be referred to as a PDCCH monitoring span or a PDCCH monitoring occasion.

One CCE may include a plurality of resource element groups (REGs). The REG may be comprised of one symbol and 12 resource elements.

Next, the base station may transmit information for the PDCCH monitoring duration to the UE in S1906.

The information for the PDCCH monitoring duration may include information for a search space set and/or information for a control resource set (CORESET). The UE may determine the PDCCH monitoring duration based on information for the search space set and/or information for the control resource set.

The base station may receive the UE capability information from the UE and may transmit and/or configure the information for the PDCCH monitoring duration so that it does not exceed a UE's capability based on the UE capability information. The UE may perform the channel estimation based on the CCE in the monitoring duration.

Upon the channel estimation, when the number of CCEs in the PDCCH monitoring duration exceeds the UE's capability, the UE may, based on a pre-defined and/or pre-configured priority, preferentially channel-estimate a PDCCH monitoring duration and/or a CCE with a higher priority and skip a PDCCH monitoring duration and/or a CCE with a lower priority.

In this instance, when the number of CCEs in the PDCCH monitoring duration exceeds a maximum number of CCEs that the UE can support, the base station may expect to preferentially channel-estimate a PDCCH monitoring duration and/or a CCE with a higher priority and skip a PDCCH monitoring duration and/or a CCE with a lower priority.

Information for the maximum number of CCEs may be determined based on at least one of a length of the PDCCH monitoring duration, an interval between the PDCCH monitoring durations, and/or numerology. For example, the information for the maximum number of CCEs may include a maximum number of CCEs that the UE can channel-estimate in one PDCCH monitoring duration per at least one of a length of the PDCCH monitoring duration, an interval between the PDCCH monitoring durations, and/or numerology.

The maximum number of CCEs may be the number of non-overlapped CCEs.

And/or, the information for the maximum number of CCEs may be determined based on at least one of a service type, quality of service (QoS), service requirement, and/or processing time. For example, the information for the maximum number of CCEs may include a maximum number of CCEs that the UE can channel-estimate in one PDCCH monitoring duration per at least one of a service type, quality of service (QoS), service requirement, and/or processing time. For example, the service type may mean whether or not the service type is for transmitting and receiving eMBB data and URLLC data. The service requirement may mean BLER requirement, reliability requirement, and/or latency requirement, and the like. The processing time may mean a physical downlink shared channel (PDSCH) processing time, a channel state information (CSI) computation time, and/or a physical uplink shared channel (PUSCH) preparation time, and the like.

And/or, the information for the maximum number of CCEs may be determined based on at least one of a PDSCH processing time and/or a PUSCH preparation time of the UE. For example, the information for the maximum number of CCEs may include a maximum number of CCEs that the UE can channel-estimate in one PDCCH monitoring duration per at least one of a PDSCH processing time and/or a PUSCH preparation time.

And/or, the information for the maximum number of CCEs may be determined based on at least one of a transport block size, the number of layers, and/or the number of RBs of at least one of PDSCH and/or PUSCH. For example, the information for the maximum number of CCEs may include a maximum number of CCEs that the UE can channel-estimate in one PDCCH monitoring duration per transport block size of the PDSCH.

And/or, a timing interval (e.g., K0) between PDCCH and PDSCH may be configured by the base station based on information for the maximum number of CCEs. For example, a timing interval between PDCCH and PDSCH configured as the maximum number of CCEs increases may increase. And/or, a timing interval (e.g., K2) between PDCCH and PUSCH may be configured by the base station based on information for the maximum number of CCEs. And/or, a timing interval (e.g., K0) between PDCCH and HARQ-ACK information transmission may be configured by the base station based on information for the maximum number of CCEs.

Since the operation method of the base station described with reference to FIG. 19 is the same as the operation method of the base station described with reference to FIGS. 1 to 18, a further description thereof is omitted.

With regard to this, the above-described operation of the base station can be implemented in detail by a base station 2010 illustrated in FIG. 20. For example, the above-described operation of the base station can be performed by a processor 2011 and/or an RF unit 2013.

Referring to FIG. 20, first, the processor 2011 may transmit a synchronization signal block (SSB) to a UE through the RF unit 2013 in S1901. The SSB may include a primary synchronization signal (PSS), a secondary synchronization signal (SSS), and a physical broadcast channel (PBCH). The UE may synchronize with the base station based on the PSS and the SSS and acquire information such as a cell ID. The UE may receive the PBCH and receive in-cell broadcast information (e.g., MIB).

Next, the processor 2011 may transmit system information (SI) to the UE based on the SSB through the RF unit 2013 in S1902. The system information may mean a system information block (SIB). After acquiring the synchronization, the UE may receive the system information based on the PBCH. The PBCH may include information (e.g., pdcch-ConfigSIB1) such as a frequency location of the system information.

Next, the processor 2011 may receive a physical random access channel (PRACH) preamble from the UE through the RF unit 2013 in S1903. When there is no resource for initial access or signal transmission, the UE may transmit the PRACH preamble to the base station. And/or, the UE may receive a PDCCH order from the base station and transmit the PRACH preamble to the base station.

Next, the processor 2011 may transmit a response to the PRACH preamble to the UE through the RF unit 2013 in S1904. In case of contention based RACH, the UE may additionally perform a contention resolution procedure. Hence, the UE may acquire uplink synchronization.

Next, the processor 2011 may receive, from the UE, UE capability information related to a channel estimation through the RF unit 2013 in S1905.

The UE capability information may include information for a maximum number of control channel elements (CCEs) that are capable of channel estimation per PDCCH monitoring duration. In the present disclosure, the PDCCH monitoring duration may be referred to as a PDCCH monitoring span or a PDCCH monitoring occasion.

One CCE may include a plurality of resource element groups (REGs). The REG may be comprised of one symbol and 12 resource elements.

Next, the processor 2011 may transmit information for the PDCCH monitoring duration to the UE through the RF unit 2013 in S1906.

The information for the PDCCH monitoring duration may include information for a search space set and/or information for a control resource set (CORESET). The UE may determine the PDCCH monitoring duration based on information for the search space set and/or information for the control resource set.

The base station may receive the UE capability information from the UE and may transmit and/or configure the information for the PDCCH monitoring duration so that it does not exceed a UE's capability based on the UE capability information. The UE may perform the channel estimation based on the CCE in the monitoring duration.

Upon the channel estimation, when the number of CCEs in the PDCCH monitoring duration exceeds the UE's capability, the UE may, based on a pre-defined and/or pre-configured priority, preferentially channel-estimate a PDCCH monitoring duration and/or a CCE with a higher priority and skip a PDCCH monitoring duration and/or a CCE with a lower priority.

In this instance, when the number of CCEs in the PDCCH monitoring duration exceeds a maximum number of CCEs that the UE can support, the base station may expect to preferentially channel-estimate a PDCCH monitoring duration and/or a CCE with a higher priority and skip a PDCCH monitoring duration and/or a CCE with a lower priority.

Information for the maximum number of CCEs may be determined based on at least one of a length of the PDCCH monitoring duration, an interval between the PDCCH monitoring durations, and/or numerology. For example, the information for the maximum number of CCEs may include a maximum number of CCEs that the UE can channel-estimate in one PDCCH monitoring duration per at least one of a length of the PDCCH monitoring duration, an interval between the PDCCH monitoring durations, and/or numerology.

The maximum number of CCEs may be the number of non-overlapped CCEs.

And/or, the information for the maximum number of CCEs may be determined based on at least one of a service type, quality of service (QoS), service requirement, and/or processing time. For example, the information for the maximum number of CCEs may include a maximum number of CCEs that the UE can channel-estimate in one PDCCH monitoring duration per at least one of a service type, quality of service (QoS), service requirement, and/or processing time. For example, the service type may mean whether or not the service type is for transmitting and receiving eMBB data and URLLC data. The service requirement may mean BLER requirement, reliability requirement, and/or latency requirement, and the like. The processing time may mean a physical downlink shared channel (PDSCH) processing time, a channel state information (CSI) computation time, and/or a physical uplink shared channel (PUSCH) preparation time, and the like.

And/or, the information for the maximum number of CCEs may be determined based on at least one of a PDSCH processing time and/or a PUSCH preparation time of the UE. For example, the information for the maximum number of CCEs may include a maximum number of CCEs that the UE can channel-estimate in one PDCCH monitoring duration per at least one of a PDSCH processing time and/or a PUSCH preparation time.

And/or, the information for the maximum number of CCEs may be determined based on at least one of a transport block size, the number of layers, and/or the number of RBs of at least one of PDSCH and/or PUSCH. For example, the information for the maximum number of CCEs may include a maximum number of CCEs that the UE can channel-estimate in one PDCCH monitoring duration per transport block size of the PDSCH.

And/or, a timing interval (e.g., K0) between PDCCH and PDSCH may be configured by the base station based on information for the maximum number of CCEs. For example, a timing interval between PDCCH and PDSCH configured as the maximum number of CCEs increases may increase. And/or, a timing interval (e.g., K2) between PDCCH and PUSCH may be configured by the base station based on information for the maximum number of CCEs. And/or, a timing interval (e.g., K0) between PDCCH and HARQ-ACK information transmission may be configured by the base station based on information for the maximum number of CCEs.

Since the operation of the base station described with reference to FIG. 20 is the same as the operation of the base station described with reference to FIGS. 1 to 18, a further description thereof is omitted.

Overview of Device to which the Present Disclosure is Applicable

FIG. 20 illustrates an example of an internal block diagram of a wireless communication device to which the present disclosure is applicable.

Referring to FIG. 20, a wireless communication system includes a base station 2010 and multiple UEs 2020 located in an area of the base station. Hereinafter, the base station 2010 and the UEs 2020 may be referred to as wireless devices.

The base station 2010 includes a processor 2011, a memory 2012, and a radio frequency (RF) unit 2013. The processor 2011 implements functions, processes, and/or methods described in FIGS. 1 to 19. Layers of radio interface protocol may be implemented by the processor 2011. The memory 2012 is connected to the processor 2011 and stores various types of information for driving the processor 2011. The RF unit 2013 is connected to the processor 2011 and transmits and/or receives radio signals.

The UE 2020 includes a processor 2021, a memory 2022, and a RF unit 2023. The processor 2021 implements functions, processes, and/or methods described in FIGS. 1 to 19. Layers of radio interface protocol may be implemented by the processor 2021. The memory 2022 is connected to the processor 2021 and stores various types of information for driving the processor 2021. The RF unit 2023 is connected to the processor 2021 and transmits and/or receives radio signals.

The memories 2012 and 2022 may be inside or outside the processors 2011 and 2021 and may be connected to the processors 2011 and 2021 through various well-known means.

The memories 2012 and 2022 may store programs for the processing and control of the processors 2011 and 2021 and may temporarily store input/output information.

The memories 2012 and 2022 may serve as buffers.

Further, the base station 2010 and/or the UE 2020 may have a single antenna or multiple antennas.

Figure 21:
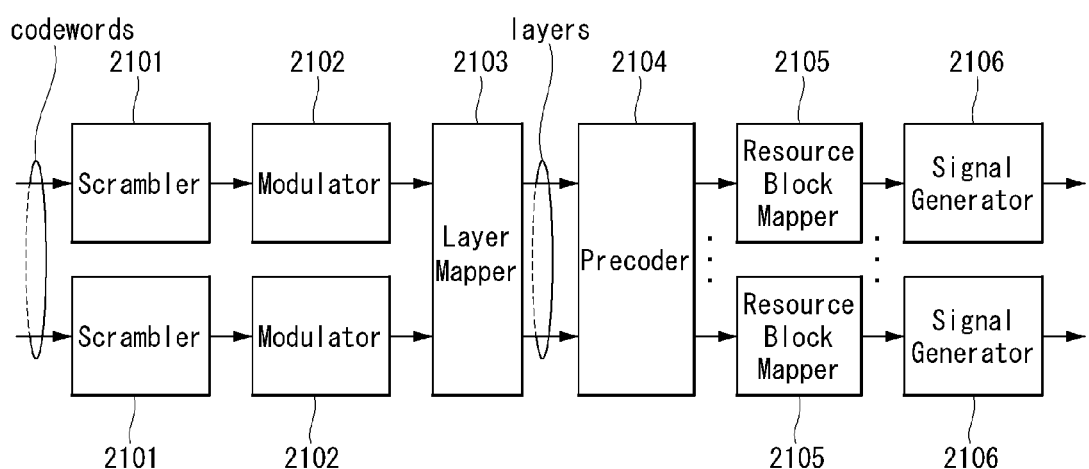
FIG. 21 illustrates an example of a signal processing module structure in a base station or a UE.

FIG. 21 illustrates an example of a signal processing module structure in a base station or a UE. The signal processing may be performed by processors of a base station/UE such as the processors 2011 and 2021 of FIG. 20.

Referring to FIG. 21, a transmitting device in a UE or a base station may include a scrambler 2101, a modulator 2102, a layer mapper 2103, a precoder 2104, a resource block mapper 2105, and a signal generator 2106.

The transmitting device may scramble coded bits within one codeword for the one codeword by the scrambler 2101 and then transmit it via a physical channel.

The scrambled bits are modulated to complex-valued modulation symbols by the modulator 2102. The modulator 2102 may modulate the scrambled bits according to a predetermined modulation scheme and dispose the modulated bits as complex-valued modulation symbols representing a location on signal constellation. There is no restriction in the modulation scheme, and pi/2-BPSK (pi/2-Binary Phase Shift Keying), m-PSK (m-Phase Shift Keying), or m-QAM (m-Quadrature Amplitude Modulation), etc. may be used in the modulation of coded data.

The complex-valued modulation symbols may be mapped to one or more transport layers by the layer mapper 2103.

The complex-valued modulation symbol on each layer may be precoded by the precoder 2104 for the transmission on an antenna port. Here, the precoder 2104 may perform a transform precoding on the complex-valued modulation symbols and then perform a precoding on the complex-valued modulation symbols. Alternatively, the precoder 2104 may perform the precoding on the complex-valued modulation symbols without performing the transform precoding. The precoder 2104 may process the complex-valued modulation symbols through a MIMO scheme according to multiple transmitting antennas to output antenna-specific symbols and may distribute the antenna-specific symbols to the corresponding resource block mapper 2105. An output z of the precoder 2104 may be obtained by multiplying an output y of the layer mapper 2103 by a precoding matrix W of N×M, where N is the number of antenna ports, and M is the number of layers.

The resource block mapper 2105 maps the complex-valued modulation symbol for each antenna port to an appropriate resource element within a virtual resource block allocated for the transmission.

The resource block mapper 2105 may allocate the complex-valued modulation symbols to appropriate subcarriers and multiplex them according to a user.

The signal generator 2106 may modulate the complex-valued modulation symbols through a specific modulation scheme, for example, an orthogonal frequency division multiplexing (OFDM) scheme to generate a complex-valued time domain OFDM symbol signal. The signal generator 2106 may perform an inverse fast Fourier transform (IFFT) on the antenna-specific symbol, and a cyclic prefix (CP) may be inserted into a time domain symbol on which the IFFT is performed. An OFDM symbol goes through digital-to-analog conversion, frequency up-conversion, etc. and is transmitted to the receiving device via each transmitting antenna. The signal generator 2106 may include an IFFT module, a CP inserter, a digital-to-analog converter (DAC), a frequency up-converter, and the like.

The signal processing of the receiving device may be configured in the reverse of the signal processing of the transmitter. Specifically, the processor of the receiving device performs decoding and demodulation on a radio signal received from the outside via antenna port(s) of an RF unit. The receiving device may include a plurality of multi-receiving antennas. Each signal received via the receiving antenna is recovered as a baseband signal, and then goes through multiplexing and MIMO demodulation and is recovered to a data column that the transmitting device originally intends to transmit. The receiving device may include a signal restorer for recovering a received signal as a baseband signal, a multiplexer for combining and multiplexing the received and processed signals, and a channel demodulator for modulating a multiplexed signal string to a corresponding codeword. The signal restorer, the multiplexer, and the channel demodulator may be configured as one integrated module to perform their functions or respective independent modules. More specifically, the signal restorer may include an analog-to-digital converter (ADC) for converting an analog signal into a digital signal, a CP remover for removing a CP from the digital signal, a FFT module which applies a fast Fourier transform (FFT) to a signal, from which the CP is removed, and outputs a frequency domain symbol, and a resource element demapper/an equalizer for recovering the frequency domain symbol as an antenna-specific symbol. The antenna-specific symbol is recovered to a transport layer by the multiplexer, and the transport layer is recovered by the channel demodulator to a codeword, that the transmitting device intends to transmit.

Figure 22:
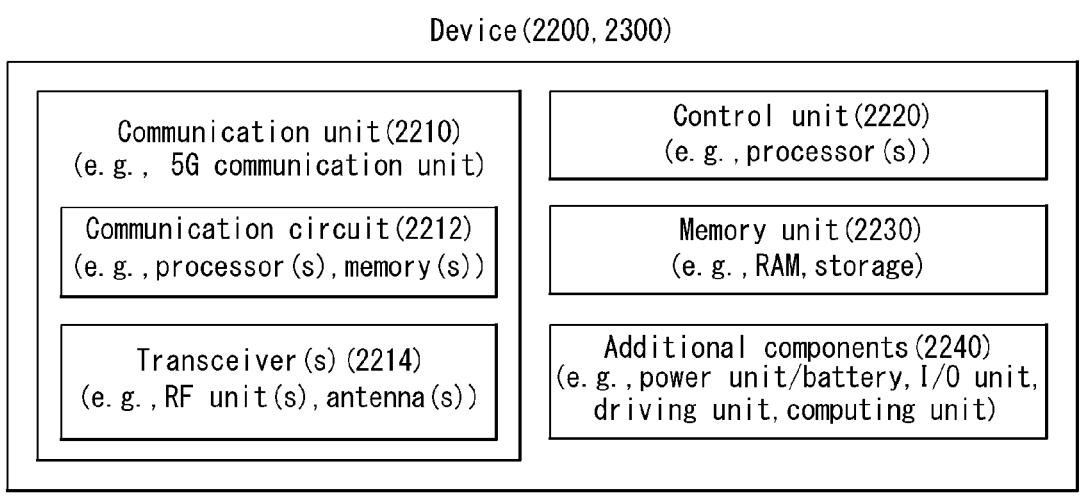
FIG. 22 illustrates another example of a wireless communication device applied to the present disclosure.

FIG. 22 illustrates another example of a wireless communication device applied to the present disclosure. The wireless communication device may be implemented in various types according to a use-case/service.

Referring to FIG. 22, wireless communication devices 2200 and 2300 may correspond to the wireless communication devices 2010 and 2020 of FIG. 20 and may consist of various elements, components, units/parts, and/or modules. Hereinafter, the wireless communication device may be referred to as a wireless device.

For example, each of the wireless communication devices 2200 and 2300 may include a communication unit 2210, a controller 2220, a memory 2230, and an additional component 2240. The communication unit 2210 may include a communication circuit 2212 and transceiver(s) 2214. For example, the communication circuit 2212 may include one or more processors 2011 and 2021 and/or one or more memories 2012 and 2022 of FIG. 20. For example, the transceiver(s) 2014 may include one or more transceivers 2014 and 2024 and/or one or more antennas 2013 and 2023 of FIG. 20. The controller 2220 is electrically connected to the communication unit 2210, the memory 2230, and the additional component 2240 and controls overall operation of the wireless communication devices. For example, the controller 2220 may control an electric/mechanical operation of the wireless communication device based on program/code/command/information stored in the memory 2230. The controller 2220 may transmit information stored in the memory 2230 to the outside (e.g., other communication devices) over a wireless/wired interface through the communication unit 2210, or store, in the memory 2230, information received over the wireless/wired interface from the outside (e.g., other communication devices) through the communication unit 2210.

The additional component 2240 may be variously configured according to types of wireless communication devices. For example, the additional component 2240 may include at least one of a power unit/battery, an input/output (I/O) unit, a driver, and a computing unit. The wireless communication device may be implemented in the form of, without being limited to, the robot 100a (see FIG. 3), the vehicle 100b (see FIG. 3), the XR device 100c (see FIG. 3), the mobile device 100d (see FIG. 3), the home appliances 100e (see FIG. 3), the IoT device, a digital broadcast terminal, a hologram device, a public safety device, an MTC device, a medical device, a FinTech device (or a financial device), a security device, a climate/environment device, the AI server/device 200 (see FIG. 3), a base station, a network node, etc. The wireless communication device may be used in a mobile or fixed place according to a use-case/service.

In FIG. 22, all the various elements, components, units/portions, and/or modules in the wireless communication devices 2200 and 2300 may be connected to each other over a wired interface, or at least a part of them may be wirelessly connected through the communication unit 2210. For example, in the wireless communication devices 2200 and 2300, the controller 2220 and the communication unit 2210 may be connected by wire, and the controller 2220 and first units (e.g., 2230 and 2240) may be wirelessly connected through the communication unit 2210. Each element, component, unit/portion, and/or module of the wireless communication devices 2200 and 2300 may further include one or more elements. For example, the controller 2220 may consist of a set of one or more processors. As an example, the controller 2220 may consist of a set of a communication control processor, an application processor, an electronic control unit (ECU), a graphical processing unit, a memory control processor, etc. As another example, the memory 2230 may consist of a random access memory (RAM), a dynamic RAM (DRAM), a read only memory (ROM)), a flash memory, a volatile memory, a non-volatile memory, and/or a combination thereof.

A wireless device in the present disclosure may be a base station, a network node, a transmitter UE, a receiver UE, a radio device, a wireless communication device, a vehicle, a vehicle with a self-driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

In the present disclosure, the UE may include a cellular phone, a smart phone, a laptop computer, a digital broadcast terminal, a personal digital assistant (PDA), a portable multimedia player (PMP), a navigator, a slate PC, a tablet PC, an ultrabook, a wearable device (e.g., a smart watch, a smart glass, a head mounted display (HMD)), a foldable device, and the like. For example, the HMD is a display device worn on the head and may be used to implement VR or AR.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the present disclosure has described a method of performing channel estimation in a wireless communication system, focusing on examples applying to the 3GPP LTE/LTE-A system, the 5G system (new RAT system), etc., the present disclosure can be applied to various wireless communication systems other than these systems.

The invention claimed is:

1. A method of monitoring, by a user equipment (UE), non-overlapped control channel elements (CCEs) in a wireless communication system, the method comprising:
receiving a synchronization signal block (SSB) from a base station;
receiving system information (SI) from the base station based on the SSB;
transmitting a physical random access channel (PRACH) preamble to the base station;
receiving a response to the PRACH preamble from the base station;
transmitting, to the base station, UE capability information for a maximum number of non-overlapped CCEs that the UE can monitor per monitoring span; and
monitoring non-overlapped CCEs based on the maximum number of non-overlapped CCEs;
wherein the UE capability information includes information related to at least one interval between monitoring spans per a numerology, and
wherein the maximum number of non-overlapped CCEs is determined based on the at least one interval between monitoring spans and the numerology.

2. The method of claim 1, wherein the maximum number of non-overlapped CCEs is determined based on at least one of a service type, quality of service (QOS), a service requirement, and/or a processing time.

3. The method of claim 1, wherein the maximum number of non-overlapped CCEs is determined based on at least one of a physical downlink shared channel (PDSCH) processing time and/or a physical uplink shared channel (PUSCH) preparation time of the UE.

4. The method of claim 1, wherein the maximum number of non-overlapped CCEs is determined based on at least one of a transport block size, a number of layers, and/or a number of resource blocks of a physical downlink shared channel (PDSCH) or a physical uplink shared channel (PUSCH).

5. The method of claim 1, wherein a timing interval between a physical downlink control channel (PDCCH) and a physical downlink shared channel (PDSCH) is configured based on the maximum number of non-overlapped CCEs.

6. A user equipment (UE) configured to monitor non-overlapped control channel elements (CCEs) in a wireless communication system, the UE comprising:
at least one transceiver configured to transmit and receive a radio signal; and
at least one processor functionally connected to the at least one transceiver,
wherein the at least one processor is configured to:
receive a synchronization signal block (SSB) from a base station;
receive system information (SI) from the base station based on the SSB;
transmit a physical random access channel (PRACH) preamble to the base station;
receive a response to the PRACH preamble from the base station;
transmit, to the base station, UE capability information for a maximum number of non-overlapped CCEs that the UE can monitor per monitoring span; and
monitor non-overlapped CCEs based on the maximum number of non-overlapped CCEs,
wherein the UE capability information includes information related to at least one interval between monitoring spans per a numerology, and
wherein the maximum number of non-overlapped CCEs is determined based on the at least one interval between monitoring spans and the numerology.

7. The UE of claim 6, wherein the maximum number of non-overlapped CCEs is determined based on at least one of a service type, quality of service (QOS), a service requirement, and/or a processing time.

8. The UE of claim 6, wherein the maximum number of non-overlapped CCEs is determined based on at least one of a physical downlink shared channel (PDSCH) processing time and/or a physical uplink shared channel (PUSCH) preparation time of the UE.

9. The UE of claim 6, wherein the maximum number of non-overlapped CCEs is determined based on at least one of a transport block size, a number of layers, and/or a number of resource blocks of a physical downlink shared channel (PDSCH) or a physical uplink shared channel (PUSCH).

10. The UE of claim 6, wherein a timing interval between a physical downlink control channel (PDCCH) and a physical downlink shared channel (PDSCH) is configured based on the maximum number of non-overlapped CCEs.

* * * * *